United States Patent
Campbell et al.

(10) Patent No.: US 12,144,282 B2
(45) Date of Patent: Nov. 19, 2024

(54) SEED SPACING DEVICE FOR AN AGRICULTURAL PLANTER AND RELATED SYSTEMS AND METHODS

(71) Applicant: Ag Leader Technology, Ames, IA (US)

(72) Inventors: Travis Campbell, Ames, IA (US); Kurt Townsend, Ames, IA (US); Loren Leusink, Ames, IA (US); Richard K. Kaufman, Ames, IA (US); Alan F. Barry, Nevada, IA (US); Douglas Gilbert, Ames, IA (US)

(73) Assignee: Ag Leader Technology, Ames, IA (US)

( * ) Notice: Subject to any disclaimer, the term of this patent is extended or adjusted under 35 U.S.C. 154(b) by 0 days.

(21) Appl. No.: 17/499,465

(22) Filed: Oct. 12, 2021

(65) Prior Publication Data

US 2022/0061208 A1    Mar. 3, 2022

Related U.S. Application Data

(62) Division of application No. 16/272,590, filed on Feb. 11, 2019, now Pat. No. 11,277,961.

(60) Provisional application No. 62/628,767, filed on Feb. 9, 2018.

(51) Int. Cl.
*A01C 7/10* (2006.01)
*A01C 7/08* (2006.01)
*A01C 7/16* (2006.01)
*A01C 21/00* (2006.01)

(52) U.S. Cl.
CPC ............... *A01C 7/105* (2013.01); *A01C 7/16* (2013.01); *A01C 7/081* (2013.01); *A01C 21/005* (2013.01)

(58) Field of Classification Search
CPC .......... A01C 7/105; A01C 7/081; A01C 7/16; A01C 21/005; A01C 7/102; A01C 7/10; A01C 7/08; A01C 7/00; A01C 21/00
See application file for complete search history.

(56) References Cited

U.S. PATENT DOCUMENTS

| | | |
|---|---|---|
| 9,439 A | 12/1852 | Colver |
| 140,493 A | 7/1873 | Fulghum |
| 540,458 A | 6/1895 | Robbins |

(Continued)

FOREIGN PATENT DOCUMENTS

| | | |
|---|---|---|
| AU | 2006203367 A1 | 2/2007 |
| BR | 102016002919 B1 | 8/2016 |

(Continued)

OTHER PUBLICATIONS

Zimmerman Manufacturing LLC "Contour King St Gallery".

(Continued)

*Primary Examiner* — Christopher J. Novosad
(74) *Attorney, Agent, or Firm* — Dentons Davis Brown PC; Matthew Warner-Blankenship

(57) ABSTRACT

Various methods, systems, and devices for flexible and accurate seed spacing control in a seed planting system. The various embodiments receive singulated seed from a metering device and control movement of the seed toward a seed spacing device that receives the seed. The seed spacing device, which is disposed near the soil surface, independently controls the ejection of the seed from the device and thus the spacing of the seed in the furrow.

17 Claims, 13 Drawing Sheets

(56) References Cited

U.S. PATENT DOCUMENTS

| | | | |
|---|---|---|---|
| 658,348 | A | 9/1900 | Crowley |
| 717,048 | A | 12/1902 | Stirling |
| 1,220,684 | A | 3/1917 | Ray |
| 1,264,454 | A | 4/1918 | Terrell |
| 1,376,933 | A | 5/1921 | Gould, Jr. |
| 1,397,689 | A | 11/1921 | Krotz |
| 1,566,187 | A | 12/1925 | Fifer |
| 1,997,791 | A | 4/1935 | Hoberg et al. |
| 2,053,390 | A | 9/1936 | Bateman et al. |
| 2,054,552 | A | 9/1936 | Wakeham |
| 2,141,044 | A | 12/1938 | Rassmann |
| 2,340,163 | A | 1/1944 | White |
| 2,440,846 | A | 5/1948 | Cannon |
| 2,510,658 | A | 6/1950 | Rassmann |
| 2,566,406 | A | 9/1951 | Dougherty |
| 2,589,762 | A | 3/1952 | Barnett et al. |
| 2,673,536 | A | 3/1954 | Skinner |
| 2,975,936 | A | 3/1961 | Rousek |
| 2,980,043 | A | 4/1961 | Beck |
| 3,077,290 | A | 2/1963 | Rehder |
| 3,122,283 | A | 2/1964 | Walters |
| 3,176,636 | A | 4/1965 | Wilcox et al. |
| 3,233,523 | A | 2/1966 | Passaggio |
| 3,253,739 | A | 5/1966 | Martin |
| 3,272,159 | A | 9/1966 | Sanderson |
| 3,325,060 | A | 6/1967 | Rehder |
| 3,343,507 | A | 9/1967 | Smith |
| 3,413,941 | A | 12/1968 | Roberson |
| 3,693,833 | A | 9/1972 | Weitz |
| 3,844,357 | A | 10/1974 | Ellinger |
| 3,913,503 | A | 10/1975 | Becker |
| 3,990,606 | A | 11/1976 | Gugenhan |
| 4,002,266 | A | 1/1977 | Beebe |
| 4,023,509 | A | 5/1977 | Hanson |
| 4,026,437 | A | 5/1977 | Biddle |
| 4,029,235 | A | 6/1977 | Grataloup |
| 4,037,755 | A | 7/1977 | Reuter |
| 4,193,458 | A | 3/1980 | Long |
| 4,193,523 | A | 3/1980 | Koning |
| 4,282,985 | A | 8/1981 | Yamamoto |
| 4,324,347 | A | 4/1982 | Thomas |
| 4,333,561 | A | 6/1982 | Schlegel |
| 4,329,911 | A | 11/1982 | Schwerin |
| 4,359,104 | A | 11/1982 | Haapala |
| 4,417,530 | A | 11/1983 | Kopecky |
| 4,449,642 | A | 5/1984 | Dooley |
| 4,600,122 | A | 7/1986 | Lundie et al. |
| 4,653,410 | A | 3/1987 | Typpi |
| 4,655,296 | A | 4/1987 | Bourgault |
| 4,700,785 | A | 10/1987 | Bartusek |
| 4,793,511 | A | 12/1988 | Ankum et al. |
| 4,865,132 | A | 9/1989 | Moore |
| 4,878,443 | A | 11/1989 | Gardner |
| 4,913,070 | A | 4/1990 | Morrison |
| 4,949,656 | A | 8/1990 | Lyle et al. |
| 4,949,869 | A | 8/1990 | Ribouleau |
| 4,986,782 | A | 1/1991 | severtson |
| 5,065,681 | A | 11/1991 | Hadley |
| 5,069,779 | A | 12/1991 | brown |
| 5,074,227 | A | 12/1991 | Schwitters |
| 5,103,924 | A | 4/1992 | Walker |
| 5,163,518 | A | 11/1992 | Foley |
| 5,170,909 | A * | 12/1992 | Lundie ............... A01C 7/046 221/266 |
| 5,277,257 | A | 1/1994 | Thompson |
| 5,366,024 | A | 11/1994 | Payne |
| 5,427,182 | A | 6/1995 | Winter |
| 5,479,992 | A | 1/1996 | Bassett |
| 5,497,837 | A | 3/1996 | Kehrney |
| 5,499,683 | A | 3/1996 | Bassett |
| 5,501,366 | A | 3/1996 | Fiorido |
| 5,601,209 | A | 2/1997 | Barsi et al. |
| 5,664,507 | A | 9/1997 | Bergland et al. |
| 5,697,308 | A | 12/1997 | Rowlett |
| 5,709,271 | A | 1/1998 | Bassett |
| 5,720,233 | A | 2/1998 | Lodico |
| 5,765,720 | A | 6/1998 | Stufflebeam |
| 5,799,598 | A | 9/1998 | Stufflebeam |
| 5,829,535 | A | 11/1998 | Line |
| 5,842,248 | A | 12/1998 | Stufflebeam et al. |
| 5,848,571 | A | 12/1998 | Stufflebeam |
| 5,862,764 | A | 1/1999 | Umemoto |
| 5,936,234 | A | 8/1999 | Thomas et al. |
| 5,961,573 | A | 10/1999 | Hale |
| 5,975,283 | A | 11/1999 | Riffe |
| 6,003,455 | A | 12/1999 | Flamme |
| 6,013,020 | A * | 1/2000 | Meloul ............... A61N 5/1007 600/7 |
| 6,068,063 | A | 5/2000 | Mayerle |
| 6,068,064 | A | 5/2000 | Bettin |
| 6,091,997 | A | 7/2000 | Flamme |
| 6,142,086 | A | 11/2000 | Richard |
| 6,260,632 | B1 | 7/2001 | Bourgault et al. |
| 6,269,758 | B1 | 8/2001 | Sauder |
| 6,293,438 | B1 | 9/2001 | Woodruff |
| 6,352,042 | B1 | 3/2002 | Martin |
| 6,378,619 | B2 | 4/2002 | Mayerle |
| 6,389,999 | B1 | 5/2002 | Duello |
| 6,516,733 | B1 | 2/2003 | Sauder |
| 6,640,731 | B1 | 11/2003 | Rowlett |
| 6,651,570 | B1 | 11/2003 | Thiemke |
| 6,681,706 | B2 | 1/2004 | Sauder et al. |
| 6,701,857 | B1 | 3/2004 | Jensen |
| 6,718,892 | B1 | 4/2004 | Rosenboom |
| 6,748,885 | B2 | 6/2004 | Sauder et al. |
| 6,752,095 | B1 | 6/2004 | Rylander et al. |
| 6,827,029 | B1 | 12/2004 | Wendte |
| 7,131,384 | B2 | 11/2006 | Kester |
| 7,263,937 | B2 | 9/2007 | Frasier |
| 7,334,532 | B2 | 2/2008 | Sauder et al. |
| 7,395,767 | B2 | 7/2008 | Sulman |
| 7,404,366 | B2 | 7/2008 | Mariman |
| 7,448,334 | B2 | 11/2008 | Mariman |
| 7,490,565 | B2 | 2/2009 | Holly |
| 7,581,684 | B2 | 9/2009 | des Garennes et al. |
| 7,584,707 | B2 | 9/2009 | Sauder et al. |
| 7,661,377 | B2 | 2/2010 | Keaton |
| 7,673,570 | B1 | 3/2010 | Bassett |
| 7,699,009 | B2 | 4/2010 | Sauder et al. |
| 7,717,048 | B2 | 5/2010 | Peterson, Jr. et al. |
| 7,854,206 | B2 | 12/2010 | Maschinen |
| 7,870,826 | B2 | 1/2011 | Bourgault |
| 7,918,168 | B2 | 4/2011 | Garner et al. |
| 7,938,074 | B2 | 5/2011 | Liu |
| 7,980,186 | B2 | 7/2011 | Henry |
| 8,020,657 | B2 | 9/2011 | Allard |
| 8,056,465 | B2 | 11/2011 | Carlz |
| 8,074,586 | B2 | 12/2011 | Garner et al. |
| 8,275,525 | B2 | 9/2012 | Kowalchuk |
| 8,276,529 | B2 | 10/2012 | Garner et al. |
| 8,286,566 | B2 | 10/2012 | Schilling |
| 8,322,293 | B2 | 12/2012 | Wollenhaupt et al. |
| 8,336,471 | B2 | 12/2012 | Gilstring |
| 8,342,258 | B2 | 1/2013 | Ryder |
| 8,346,442 | B2 | 1/2013 | Ryder |
| 8,371,239 | B2 | 2/2013 | Rans et al. |
| 8,375,873 | B2 | 2/2013 | Nelson et al. |
| 8,375,874 | B2 | 2/2013 | Peterson |
| 8,430,179 | B2 | 4/2013 | Van Buskirk |
| 8,443,742 | B2 | 5/2013 | Orrenius |
| 8,448,585 | B2 | 5/2013 | Wilhelmi et al. |
| 8,448,717 | B2 | 5/2013 | Adams et al. |
| 8,451,449 | B2 | 5/2013 | Holland |
| 8,468,960 | B2 | 6/2013 | Garner et al. |
| 8,479,671 | B2 | 7/2013 | Shoup |
| 8,522,699 | B2 | 9/2013 | Garner et al. |
| 8,522,889 | B2 | 9/2013 | Adams et al. |
| 8,544,397 | B2 | 10/2013 | Bassett |
| 8,544,398 | B2 | 10/2013 | Bassett |
| 8,550,020 | B2 | 10/2013 | Sauder et al. |
| 8,561,472 | B2 | 10/2013 | Sauder et al. |
| 8,573,111 | B2 | 11/2013 | Graham |
| 8,634,992 | B2 | 1/2014 | Sauder et al. |
| 8,636,077 | B2 | 1/2014 | Bassett |

(56) References Cited

U.S. PATENT DOCUMENTS

| | | |
|---|---|---|
| 8,671,856 B2 | 3/2014 | Garner et al. |
| 8,677,914 B2 | 3/2014 | Stark |
| 8,746,159 B2 | 6/2014 | Garner et al. |
| 8,755,049 B2 | 6/2014 | Holland |
| 8,763,713 B2 | 7/2014 | Bassett |
| 8,770,308 B2 | 7/2014 | Bassett |
| 8,776,702 B2 | 7/2014 | Bassett |
| 8,789,482 B2 | 7/2014 | Garner et al. |
| 8,789,483 B2 | 7/2014 | Gilstring |
| RE45,091 E | 8/2014 | Bassett |
| 8,800,457 B2 | 8/2014 | Garner et al. |
| 8,813,663 B2 | 8/2014 | Garner et al. |
| 8,814,474 B2 | 8/2014 | Bell |
| 8,850,995 B2 | 10/2014 | Garner |
| 8,850,998 B2 | 10/2014 | Garner et al. |
| 8,863,857 B2 | 10/2014 | Bassett |
| 8,910,582 B2 | 12/2014 | Mariman et al. |
| 8,924,092 B2 | 12/2014 | Achen |
| 8,924,102 B2 | 12/2014 | Sauder et al. |
| 8,942,896 B2 | 1/2015 | Magerle |
| RE45,412 E | 3/2015 | Sauder et al. |
| 8,978,564 B2 | 3/2015 | Hagny |
| 8,985,037 B2 | 3/2015 | Radtke |
| 8,985,232 B2 | 3/2015 | Bassett |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,119,342 B2 | 9/2015 | Bonefas |
| 9,137,941 B2 | 9/2015 | Stark |
| 9,144,187 B2 | 9/2015 | Bassett |
| 9,144,189 B2 | 9/2015 | Stoller |
| 9,148,992 B2 | 10/2015 | Staeter |
| 9,151,388 B2 | 10/2015 | Gilstring |
| 9,167,740 B2 | 10/2015 | Bassett |
| 9,173,339 B2 | 11/2015 | Sauder et al. |
| 9,192,089 B2 | 11/2015 | Bassett |
| 9,213,905 B2 | 12/2015 | Lange et al. |
| 9,226,440 B2 | 1/2016 | Bassett |
| 9,232,687 B2 | 1/2016 | Bassett |
| 9,265,191 B2 | 2/2016 | Sauder |
| 9,277,688 B2 | 3/2016 | Wilhelmi |
| 9,282,691 B2 | 3/2016 | Wilhelmi |
| 9,282,692 B2 | 3/2016 | Wilhelmi |
| 9,288,937 B2 | 3/2016 | Sauder et al. |
| 9,301,438 B2 | 4/2016 | Sauder et al. |
| 9,313,941 B2 | 4/2016 | Garner et al. |
| 9,313,942 B2 | 4/2016 | Wilhelmi |
| 9,332,689 B2 | 5/2016 | Baurer |
| 9,338,937 B2 | 5/2016 | Sauder et al. |
| 9,345,188 B2 | 5/2016 | Garner et al. |
| 9,351,440 B2 | 5/2016 | Sauder |
| 9,426,940 B2 | 8/2016 | Connors et al. |
| 9,433,141 B2 | 9/2016 | Friestad et al. |
| 9,462,744 B2 | 10/2016 | Isaacson |
| 9,480,199 B2 | 11/2016 | Garner et al. |
| 9,491,901 B2 | 11/2016 | Gentili |
| 9,510,498 B2 | 12/2016 | Tuttle et al. |
| 9,510,502 B2 | 12/2016 | Garner et al. |
| 9,532,496 B2 | 1/2017 | Sauder et al. |
| 9,554,504 B2 | 1/2017 | Houck |
| 9,578,802 B2 | 2/2017 | Radtke |
| 9,585,301 B1 | 3/2017 | Lund |
| 9,603,298 B2 | 3/2017 | Wendte et al. |
| 9,622,402 B2 | 4/2017 | Kinzenbaw et al. |
| 9,629,301 B2 | 4/2017 | Gentili |
| 9,629,302 B2 | 4/2017 | Gentili |
| 9,661,799 B2 | 5/2017 | Garner et al. |
| 9,675,002 B2 | 6/2017 | Roszman |
| 9,675,004 B2 | 6/2017 | Landphair et al. |
| 9,681,601 B2 | 6/2017 | Bassett |
| 9,686,906 B2 | 6/2017 | Garner et al. |
| 9,693,498 B2 | 7/2017 | Zumdome |
| 9,699,955 B2 | 7/2017 | Garner et al. |
| 9,699,958 B2 | 7/2017 | Koch |
| 9,706,702 B2 | 7/2017 | Wendte et al. |
| 9,723,778 B2 | 8/2017 | Bassett |
| 9,733,634 B2 | 8/2017 | Prickel |
| 9,746,007 B1 | 8/2017 | Stoller |
| 9,750,174 B2 | 9/2017 | Sauder et al. |
| 9,752,596 B2 | 9/2017 | Sauder |
| 9,769,978 B2 | 9/2017 | Radtke |
| 9,788,472 B2 | 10/2017 | Bassett |
| 9,756,779 B2 | 11/2017 | Wilhelmi et al. |
| 9,807,921 B2 | 11/2017 | Levy et al. |
| 9,807,922 B2 | 11/2017 | Garner et al. |
| 9,807,924 B2 | 11/2017 | Garner et al. |
| 9,814,172 B2 | 11/2017 | Achen et al. |
| 9,814,176 B2 | 11/2017 | Kowalchuk |
| 9,820,427 B2 | 11/2017 | Hagny |
| 9,820,429 B2 | 11/2017 | Garner et al. |
| 9,848,522 B2 | 12/2017 | Bassett |
| 9,848,523 B2 | 12/2017 | Sauder |
| 9,861,025 B2 | 1/2018 | Schaefer et al. |
| 9,861,031 B2 | 1/2018 | Garner et al. |
| 9,872,424 B2 | 1/2018 | Baurer et al. |
| 9,879,702 B2 | 1/2018 | Stoller |
| 9,936,627 B2 | 4/2018 | Wilhelmi et al. |
| 9,936,628 B2 | 4/2018 | Wilhelmi et al. |
| 9,949,426 B2 | 4/2018 | Radtke |
| 9,955,623 B2 | 5/2018 | Sauder et al. |
| 9,980,426 B2 | 5/2018 | Wilhelmi et al. |
| 10,004,173 B2 | 6/2018 | Garner et al. |
| 10,010,024 B2 | 7/2018 | Pirkenseer et al. |
| 10,051,782 B2 | 8/2018 | Wilhelmi et al. |
| 10,104,832 B2 | 10/2018 | Wilhelmi et al. |
| 10,104,830 B2 | 12/2018 | Heathcote |
| 10,143,128 B2 | 12/2018 | Landphair et al. |
| 10,154,623 B2 | 12/2018 | Wilhelmi et al. |
| 10,206,326 B2 | 2/2019 | Garner et al. |
| 10,257,973 B2 | 4/2019 | Hubner et al. |
| 10,299,425 B2 | 5/2019 | Sauder et al. |
| 10,398,077 B2 | 9/2019 | Radtke |
| 10,470,358 B2 | 11/2019 | Sauder et al. |
| 10,485,159 B2 | 11/2019 | Wilhelmi et al. |
| 10,548,259 B2 | 2/2020 | Heathcote |
| 10,609,857 B2 | 4/2020 | Sauder et al. |
| 10,645,865 B2 | 5/2020 | Bassett |
| 10,729,063 B2 | 8/2020 | Garner et al. |
| 10,743,460 B2 | 8/2020 | Gilbert et al. |
| 10,806,070 B2 | 12/2020 | Garner et al. |
| 11,058,048 B2 | 7/2021 | Radtke |
| 11,144,775 B2 | 10/2021 | Ferrari et al. |
| 11,202,404 B2 | 12/2021 | Walter et al. |
| 11,277,961 B2 * | 3/2022 | Campbell ............... A01C 7/16 |
| 11,523,554 B2 | 12/2022 | Buehler |
| 11,785,881 B2 | 10/2023 | Buehler et al. |
| 11,877,530 B2 | 1/2024 | Barry et al. |
| 2002/0056407 A1 | 5/2002 | Milne |
| 2002/0073678 A1 | 6/2002 | Lucand |
| 2003/0005867 A1 * | 1/2003 | Richard ............... A01C 7/042 |
| | | 111/174 |
| 2003/0183141 A1 | 10/2003 | Bergere et al. |
| 2004/0139895 A1 | 7/2004 | Thompson et al. |
| 2005/0172873 A1 * | 8/2005 | Mayerle ............... A01C 7/081 |
| | | 111/174 |
| 2006/0086295 A1 | 4/2006 | Jensen |
| 2008/0110382 A1 | 5/2008 | Brockmeier |
| 2009/0056531 A1 | 3/2009 | Jessen |
| 2010/0180808 A1 | 7/2010 | Liu |
| 2010/0192818 A1 | 8/2010 | Garner |
| 2010/0224110 A1 | 9/2010 | Mariman |
| 2010/0319941 A1 | 12/2010 | Peterson |
| 2011/0027479 A1 * | 2/2011 | Reineccius ............... A01C 1/08 |
| | | 118/679 |
| 2011/0313575 A1 | 12/2011 | Kowalchuk |
| 2012/0186503 A1 | 7/2012 | Sauder |
| 2013/0032363 A1 | 2/2013 | Curry et al. |
| 2013/0126460 A1 | 2/2013 | Kenley |
| 2013/0248212 A1 | 9/2013 | Bassett |
| 2013/0333601 A1 | 12/2013 | Shivak |
| 2014/0026748 A1 | 1/2014 | Stoller |
| 2014/0060869 A1 | 3/2014 | Blunier |
| 2014/0116735 A1 | 5/2014 | Bassett |

(56) References Cited

U.S. PATENT DOCUMENTS

| | | |
|---|---|---|
| 2014/0214284 A1 | 7/2014 | Sauder et al. |
| 2014/0216771 A1 | 8/2014 | Bassett |
| 2014/0262378 A1 | 9/2014 | Connors |
| 2014/0303854 A1 | 10/2014 | Zielke |
| 2015/0094916 A1 | 4/2015 | Bauerer et al. |
| 2015/0176614 A1 | 6/2015 | Stoller |
| 2015/0195988 A1 | 7/2015 | Radtke |
| 2015/0264857 A1 | 9/2015 | Achen |
| 2015/0271986 A1 | 10/2015 | Sauder et al. |
| 2015/0305229 A1 | 10/2015 | Sauder |
| 2015/0319919 A1 | 11/2015 | Sauder |
| 2015/0351315 A1 | 12/2015 | Wendte |
| 2016/0007521 A1 | 1/2016 | Kusler |
| 2016/0040692 A1 | 2/2016 | Stoller |
| 2016/0128269 A1 | 5/2016 | Helmick |
| 2016/0128272 A1 | 5/2016 | Sauder |
| 2016/0143213 A1* | 5/2016 | Kowalchuk ............ A01C 7/127 111/170 |
| 2016/0157412 A1 | 6/2016 | Sauder |
| 2016/0212932 A1 | 7/2016 | Radtke |
| 2016/0227700 A1* | 8/2016 | Wendte .................. A01C 7/20 |
| 2016/0249525 A1 | 9/2016 | Baurer et al. |
| 2017/0013771 A1 | 1/2017 | Townsend |
| 2017/0034995 A1 | 2/2017 | Wilhelmi |
| 2017/0086347 A1 | 3/2017 | Sauder |
| 2017/0094889 A1 | 4/2017 | Garner |
| 2017/0223947 A1 | 8/2017 | Gall et al. |
| 2017/0354079 A1 | 12/2017 | Foster |
| 2017/0357029 A1 | 12/2017 | Lakshmanan |
| 2017/0367252 A1 | 12/2017 | Sakaguchi |
| 2018/0015490 A1 | 1/2018 | Grimm |
| 2018/0092287 A1 | 4/2018 | Garner |
| 2018/0092288 A1 | 4/2018 | Garner |
| 2018/0125000 A1 | 5/2018 | Levy |
| 2018/0132422 A1 | 5/2018 | Hassanzadeh et al. |
| 2018/0132423 A1 | 5/2018 | Rowan |
| 2018/0210443 A1 | 7/2018 | Matsuzaki |
| 2018/0263174 A1 | 9/2018 | Hodel |
| 2018/0368310 A1 | 12/2018 | Zimmerman |
| 2018/0373264 A1 | 12/2018 | Madsen |
| 2019/0029165 A1 | 1/2019 | Leimkuehler et al. |
| 2019/0059206 A1 | 3/2019 | Stanhope |
| 2019/0072114 A1 | 3/2019 | Myers et al. |
| 2019/0124824 A1 | 5/2019 | Hubner |
| 2019/0174666 A1 | 6/2019 | Manternach |
| 2019/0254223 A1 | 8/2019 | Eichhorn et al. |
| 2019/0297769 A1 | 10/2019 | Zielke et al. |
| 2019/0297774 A1 | 10/2019 | Hamilton |
| 2019/0373801 A1 | 12/2019 | Schoeny |
| 2020/0029486 A1 | 1/2020 | Buehler et al. |
| 2020/0068783 A1 | 3/2020 | Strnad |
| 2020/0100419 A1 | 4/2020 | Stanhope |
| 2020/0128723 A1 | 4/2020 | Eichhorn |
| 2020/0154629 A1 | 5/2020 | Holoubek et al. |
| 2020/0221630 A1 | 7/2020 | Pomedli |
| 2020/0305335 A1 | 10/2020 | Schoeny |
| 2020/0329631 A1 | 10/2020 | Johnson |
| 2020/0352088 A1 | 11/2020 | Arnett |
| 2020/0359552 A1 | 11/2020 | Gilbert et al. |
| 2020/0359559 A1 | 11/2020 | Koch |
| 2020/0375081 A1 | 12/2020 | Holoubek |
| 2021/0022286 A1 | 1/2021 | Gilbert et al. |
| 2021/0037699 A1 | 2/2021 | Wilhelmi |
| 2021/0059102 A1 | 3/2021 | Geistkemper |
| 2021/0120726 A1 | 4/2021 | Barrick |
| 2021/0153421 A1 | 5/2021 | Holoubek et al. |
| 2021/0185903 A1 | 6/2021 | Demiter et al. |
| 2021/0235611 A1 | 8/2021 | Fett |
| 2021/0243941 A1 | 8/2021 | Buehler |
| 2021/0307236 A1 | 10/2021 | Strnad et al. |
| 2022/0000008 A1 | 1/2022 | Hubner et al. |
| 2022/0061202 A1 | 3/2022 | Holoubek et al. |
| 2022/0142039 A1 | 5/2022 | Eichhorn et al. |
| 2022/0151138 A1 | 5/2022 | Barry |
| 2022/0174855 A1 | 6/2022 | Zielke et al. |
| 2022/0192080 A1 | 6/2022 | Goza et al. |
| 2022/0232753 A1 | 7/2022 | Van De Woestyne et al. |
| 2023/0105245 A1 | 4/2023 | Buehler |
| 2023/0180653 A1 | 6/2023 | Barry et al. |
| 2023/0232732 A1 | 7/2023 | Hartogh |
| 2023/0232733 A1 | 7/2023 | Barry |
| 2023/0388458 A1 | 11/2023 | Eichhorn et al. |
| 2023/0413720 A1 | 12/2023 | Barry et al. |
| 2024/0040955 A1 | 2/2024 | Barry |

FOREIGN PATENT DOCUMENTS

| | | | |
|---|---|---|---|
| BR | 102015003633 A2 | 2/2021 | |
| CA | 1218266 A | 2/1987 | |
| CA | 2213354 A1 | 7/2002 | |
| CA | 2213703 A1 | 7/2002 | |
| CA | 2213350 A1 | 9/2002 | |
| CA | 2549371 A1 | 11/2007 | |
| CA | 2584736 A1 | 9/2008 | |
| CA | 2923713 C | 12/2016 | |
| CA | 2830627 C | 5/2019 | |
| CA | 2915844 C | 4/2020 | |
| CN | 112601450 A | 4/2021 | |
| DE | 389840 C | 2/1924 | |
| DE | 2011462 A1 | 9/1971 | |
| DE | 2826658 A1 | 4/1981 | |
| DE | 8400142 U1 | 5/1984 | |
| DE | 3405031 C1 | 4/1985 | |
| EP | 0047577 A2 | 3/1982 | |
| EP | 0152048 A2 | 5/1986 | |
| EP | 0182220 A2 | 4/1990 | |
| EP | 372901 A2 | 6/1990 | |
| EP | 0606541 A1 | 1/1997 | |
| EP | 2688384 B1 | 1/2014 | |
| EP | 2832203 A1 | 2/2015 | |
| EP | 2911497 B1 | 2/2015 | |
| EP | 2911499 B1 | 2/2015 | |
| EP | 1461989 A1 | 5/2015 | |
| EP | 3108731 A1 | 12/2016 | |
| FR | 1503687 A | 12/1967 | |
| FR | 2414288 A1 | 8/1979 | |
| FR | 2591061 A1 | 6/1986 | |
| FR | 2574243 A1 | 6/1987 | |
| GB | 18381 A | 10/1904 | |
| GB | 482789 A | 4/1937 | |
| GB | 989145 A | 4/1965 | |
| GB | 2012534 A | 8/1979 | |
| GB | 2057835 A | 4/1981 | |
| GB | 2309622 A | 6/1997 | |
| JP | 56-24815 A | 3/1981 | |
| JP | H1159886 A | 3/1999 | |
| JP | 2007117941 A | 5/2007 | |
| JP | 4517467 B2 * | 8/2010 | ............ A01C 11/02 |
| NL | 1005451 C2 | 9/1998 | |
| RU | 2355152 C2 * | 5/2009 | ............... A01C 7/16 |
| SU | 948316 A1 | 8/1982 | |
| SU | 1148582 A * | 4/1985 | ............... A01C 7/16 |
| WO | 1998049884 A1 | 11/1998 | |
| WO | 2005011358 A1 | 2/2005 | |
| WO | 2009134144 A1 | 11/2009 | |
| WO | 2010059101 A1 | 5/2010 | |
| WO | 2010124360 A1 | 11/2010 | |
| WO | 2013130003 A1 | 9/2013 | |
| WO | 2014153157 A1 | 9/2014 | |
| WO | 2015171908 A1 | 11/2015 | |
| WO | 2017160860 A1 | 9/2017 | |
| WO | 2017197274 A1 | 11/2017 | |
| WO | 2017197292 A1 | 11/2017 | |
| WO | 2021021594 A1 | 2/2021 | |

OTHER PUBLICATIONS

Zimmerman Manufacturing LLC "Contour King St" Zimmerman Manufacturing Equipment.
Precision Planting "FurrowForce" https://www.precisionplanting.com/products/product/furrowforce.
Precision Planting "FurrowJet" https://www.precisionplanting.com/products/product/furrowjet.

(56) References Cited

OTHER PUBLICATIONS

Kasper et al. "Relationship Between Six Years of Corn Yields and Terrain Attributes." 2003, Precision Agriculture vol. 4, pp. 87-101.
Orthman "1tRIPr Precision Tillage System" Brochure.
Deere "SeedStar XP Monitor for Planters" pp. 70-78 - 70-9.
ZML Contour King—YouTube Video—https://www.youtube.com/watch?v=T-rj_EZMCM4.
Dawn Equipment—Twitter Video—https://twitter.com/DawnEquipment/status/969698839409111045.
AG Leader Technology, "AG Leader SureSpeed", Feb. 17, 2020, Publisher: YouTube.
AG Leader Technology, "AG Leader SureSpeed Unveiling", Feb. 12, 2020, Publisher: Youtube.
Kinze Manufacturing, "True Speed—3D with Ultra Slow Motion", Feb. 24, 2020, Publisher: YouTube.
Kinze Manufacturing, "High Speed Planting Solution True Speed", 2020, Publisher: Kinze.
Kinze Manufacturing, "An In-Depth Look into Kinze's True Speed", Feb. 26, 2020, Publisher: YouTube.
Tempo, 2017, Publisher: Vaderstad.

\* cited by examiner

SEED SPACING DEVICE FOR AN AGRICULTURAL PLANTER AND RELATED SYSTEMS AND METHODS

CROSS-REFERENCE TO RELATED APPLICATION(S)

This application is a divisional application of U.S. application Ser. No. 16/272,590, filed Feb. 11, 2019, and entitled "Seed Spacing Device For An Agricultural Planter and Related Systems and Methods," which claims the benefit under 35 U.S.C. § 119(e) to U.S. Provisional Application 62/628,767, filed Feb. 9, 2018, and entitled "Seed Spacing Device, System, and Method for Planters," both of which are hereby incorporated herein by reference in their entirety.

FIELD OF THE INVENTION

The disclosed technology relates generally to devices, systems and methods for use in planting, including high-speed planting technologies, and in particular, to seed delivery devices having seed spacing features or components that provide flexible and controlled seed spacing at or near the seed furrow for accurate seed delivery to the furrow at a variety of speeds, including high speeds.

BACKGROUND OF THE INVENTION

As agricultural planting technologies continues to improve, high-speed precision agriculture is fast becoming the industry standard. Under these high-speed parameters, agricultural planters are required to put seeds in the ground with precise and repeatable spacing between the seeds in order to maximize crop health and yield. This seed spacing must be maintained at any ground speed, including both high speeds and slower speeds. The ability to turn off seed dispensing or change the seed dispensing rate on individual rows is also highly desirable for various reasons, including, for example, to eliminate planting overlap and to keep seed spacing consistent across all rows on a curve.

Seed singulation and spacing are controlled in most known planting technologies by the seed meter. That is, existing seed metering designs use mechanical meters to both singulate the seeds and place them in the furrow at the desired spacing. Generally, seed spacing is determined in these designs by the spacing of the seed slots/openings in the metering disc and the speed at which the meter is operated.

According to one known seed delivery technology, once the seeds exit the seed meter, seed delivery typically consists of allowing the seeds to fall to the ground as a result of gravity via an unobstructed pathway between the seed meter and the furrow such as a seed delivery tube or the like. One such example of a gravity-based seed delivery device 50 is depicted in FIG. 1C, in which a seed meter 52 singulates seed from a bulk supply (not shown), serially transfers each singulated seed to a seed tube 54, and then relies on gravity to deliver the seed to the furrow.

Reliance on gravity for seed delivery has disadvantages. One such disadvantage relates to the fact that most row crop planters have a seed singulating meter that is located at a substantial distance from the soil surface. The result is that rapid vertical movement as the planter unit follows the field terrain can affect the seed drop from the meter and result in inaccurate spacing. Another disadvantage is that the forward travel speed of the planter is limited by the reliance on gravity for seed delivery. That is, delivery of the seed via gravity means that the planter must travel in a limited speed range in order to prevent inaccurate seed spacing. More specifically, due to gravity, the seed is falling at a steady, unchangeable rate (equal to about 5.5 MPH when it contacts the soil). As a result, if the planter is traveling slower than that, the seed may roll rearward in the furrow. In contrast, if the planter is traveling faster than 5.5 MPH, the seed may roll forward in the furrow. Hence, the speed of the planter can result in inaccurate spacing, which can result in reduced yields in the field.

Newer known seed delivery technologies have included delivery mechanisms to mechanically deliver seed to a location closer to the seed furrow, thereby reducing the effects of gravity and accelerating the seed discharge velocity so the planter can be operated at faster travel speeds. An example of a mechanical seed delivery device 56 is depicted in FIG. 1D, in which a seed meter 58 singulates seed from a bulk supply (not shown), transfers each singulated seed to a mechanical conveyor 60, and then relies on that mechanical conveyor 60 to move the seeds to the seed furrow. In certain known examples, the conveyor 60 is a brush belt 60 that continually moves a brush (not shown) on the exterior of the belt (not shown) such that it transports each singulated seed from the seed meter 58 to the seed furrow. Two specific examples are disclosed in U.S. Pat. Nos. 9,686,906 and 9,578,802, both of which are hereby incorporated herein by reference in their entireties.

However, these mechanical delivery mechanisms have disadvantages as well. For example, these seed delivery devices require a specifically designed seed meter to operate in conjunction with the delivery mechanism. Also, in these mechanisms, the seed spacing is still ultimately controlled at the seed meter when the seed is transferred from the meter to the delivery mechanism. That is, the delivery mechanism cannot improve spacing errors caused by a poor transfer of the seed from the meter. A further disadvantage of these mechanical devices that utilize belts with paddles and similar configurations is a spacing accuracy limitation inherent to its design. The seeds per second delivered from the meter to the seed delivery mechanism are determined by the desired population and the travel speed. In contrast, the delivery belt speed is determined solely by the travel speed of the planter. Since the paddle spacing on the belt is fixed (approximately ⅝ inches for most such belts), the narrowest seed spacing achievable is equal to the paddle spacing (⅝") and multiples of that. Hence, the minimum spacing that can be achieved is determined by the construction of the belt (the size of the seed chambers between the paddles) and greater seed spacings are a multiple of the spacing determined by the construction of the belt. As a result, the seeds per second singulated from the meter and the seeds per second delivered by the belt are not in synch, and this can lead to inaccurate spacing as the seed is transferred from the meter to the belt.

Another relatively new but known seed delivery technology is the use of air velocity (or pressure) to accelerate the seed from the meter to the furrow. One such example is depicted in FIG. 1E, in which the seed delivery device 62 is a pressurized air delivery device 62. In this example, a seed meter 64 singulates seed from a bulk supply (not shown), transfers each singulated seed to a seed tube 66, and pressurized air is provided in the seed tube 66 to accelerate the seeds along the tube 66 to the furrow. Examples include the systems disclosed in U.S. Pat. Nos. 8,443,742, 8,789,483, and 9,137,941, all of which are hereby incorporated herein by reference in their entireties.

However, one disadvantage of these air-based delivery mechanisms is that they are limited to only operating effectively at high speeds, not a range of speeds that will ultimately be determined by field conditions. While some known air-based delivery devices compensate for the seed velocity by delivering the seed under a press wheel that traps the seed, such wheels can cause problems by lifting seed from the soil (and leaving them on top of the soil surface, rather than beneath the surface) in poor conditions, such as wet soil.

There is a need in the art for improved systems, methods, and devices for spacing seeds during delivery to the seed furrow in both conventional and high-speed planting implements.

BRIEF SUMMARY OF THE INVENTION

Discussed herein are various seed delivery systems, including seed spacing devices and systems. Also included are row units and planting systems that incorporate the seed spacing and delivery devices and systems.

In Example 1, an system for controlling seed spacing in a field comprises a seed metering device constructed and arranged to singulate seed, a seed delivery channel comprising a proximal opening at a proximal end in communication with the seed metering device and a distal opening at a distal end, a seed spacing device disposed adjacent to the distal end of the seed channel, the seed spacing device comprising a seed ejection wheel rotatably disposed therein, and a seed ejection wheel actuator operably coupled to the seed ejection wheel, the actuator constructed and arranged to control starting, stopping, and rotational speed of the seed ejection wheel.

Example 2 relates to the system according to Example 1, wherein the seed spacing device comprises a housing, wherein the seed ejection wheel is rotatably disposed within the housing, a seed intake channel in communication with the distal opening of the seed channel such that the seed intake channel is constructed and arranged to receive seeds from the seed channel, and a seed ejection opening defined in the housing.

Example 3 relates to the system according to Example 1, wherein the seed ejection wheel comprises at least three seed chambers defined along an outer periphery of the wheel.

Example 4 relates to the system according to Example 3, wherein the at least three seed chambers are defined by at least three projections extending radially from the wheel.

Example 5 relates to the system according to Example 1, wherein the seed ejection wheel comprises a core wheel and a plurality of bristles coupled to an outer periphery of the core wheel and extending radially therefrom.

Example 6 relates to the system according to Example 1, further comprising an air pressure source operably coupled to the seed delivery channel.

Example 7 relates to the system according to Example 6, wherein the air pressure source is operably coupled to the seed delivery channel at or near the proximal end of the seed delivery channel, wherein the air pressure source is in fluidic communication with a lumen of the seed delivery channel.

In Example 8, a planting row unit comprises a seed metering system comprising a seed metering device constructed and arranged to singulate seed and a seed delivery system comprising an elongate seed channel, a seed spacing device disposed adjacent to the distal end of the seed channel, the seed spacing device comprising a housing and a seed ejection wheel rotatably disposed within the housing, and a seed ejection wheel actuator operably coupled to the seed ejection wheel, the actuator constructed and arranged to sequentially start and stop rotation of the seed ejection wheel in a series of cycles comprising a partial rotation. The seed channel comprises a lumen defined within the seed channel, a proximal opening defined at a proximal end, wherein the proximal opening is in communication with the seed metering device and the further is in communication with the lumen, and a distal opening defined at a distal end, wherein the distal opening is in communication with the lumen.

Example 9 relates to the planting row unit according to Example 8, wherein the seed spacing device comprises a seed intake channel in communication with the distal opening of the seed channel such that the seed intake channel is constructed and arranged to receive seeds from the seed channel, and a seed ejection opening defined in the housing.

Example 10 relates to the planting row unit according to Example 8, wherein the seed ejection wheel comprises at least three seed chambers defined along an outer periphery of the wheel.

Example 11 relates to the planting row unit according to Example 10, wherein the at least three seed chambers are defined by at least three projections extending radially from the wheel.

Example 12 relates to the planting row unit according to Example 8, wherein the seed ejection wheel comprises a core wheel and a plurality of bristles coupled to an outer periphery of the core wheel and extending radially therefrom.

Example 13 relates to the planting row unit according to Example 8, further comprising an air pressure source operably coupled to the seed delivery channel.

Example 14 relates to the planting row unit according to Example 13, wherein the air pressure source is operably coupled to the seed delivery channel at or near the proximal end of the seed delivery channel, wherein the air pressure source is in fluidic communication with the lumen of the seed delivery channel.

Example 15 relates to the planting row unit according to Example 8, wherein the partial rotation comprises about ⅓ of a full rotation.

Example 16 relates to the planting row unit according to Example 8, wherein the seed metering device and the seed spacing device are separated by a distance of several inches to several feet.

In Example 17, a method of controlling seed spacing in planting of seeds comprises singulating seed at an independently controllable rate toward a seed spacing device, controlling movement of the singulated seed toward the seed spacing device, receiving each metered singulated seed in the seed spacing device, and ejecting each metered singulated seed via the seed spacing device at a seed spacing in the seed furrow at an independently controllable rate.

Example 18 relates to the method according to Example 17, wherein the ejecting is correlated with seed spacing and planter speed.

Example 19 relates to the method according to Example 17, wherein the metering and receiving are sequentially and spatially separated.

Example 20 relates to the method according to Example 17, wherein the controlling movement of the singulated seed toward the seed spacing device further comprises moving the singulated seed toward the seed spacing device at a rate higher than a rate based solely on gravity.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments herein relate to agricultural planting systems having seed delivery systems and devices that provide precise and repeatable seed spacing that can be maintained at any ground speed, including the ground speeds of both conventional and high-speed planting systems. The various embodiments herein relate to seed delivery devices and systems that have a seed spacing mechanism or device that provides seed spacing and acceleration at a location near the seed furrow such that the seeds are spaced evenly in the furrow. More specifically, the various implementations are seed delivery systems or devices (or components thereof) that receive singulated seed from a seed meter (or other type of seed singulation device), transport the seed toward a seed spacing device near the seed furrow, and then use the seed spacing device to accelerate the seed into the furrow in a controlled manner. In certain embodiments, the seed spacing device can compensate for the forward travel speed of the planting system by ejecting individual seeds at a rearward velocity equal to the forward travel speed and further can adjust that ejection speed as the planter speed varies. Thus, it is understood that the various seed delivery systems and devices herein provide separation of seed singulation and seed spacing. While most planting systems rely on the seed metering device to both singulate and space the seeds, the various implementations disclosed or contemplated herein provide separate singulation and spacing devices, thereby providing for greater flexibility, control, and effectiveness of seed spacing in the furrow. It is understood that the various seed delivery and spacing implementations disclosed or contemplated herein can be incorporated into any known planting or seeding machine, such as, but not limited to, row crop planters, grain drills, air seeders, etc.

Figure 1A:
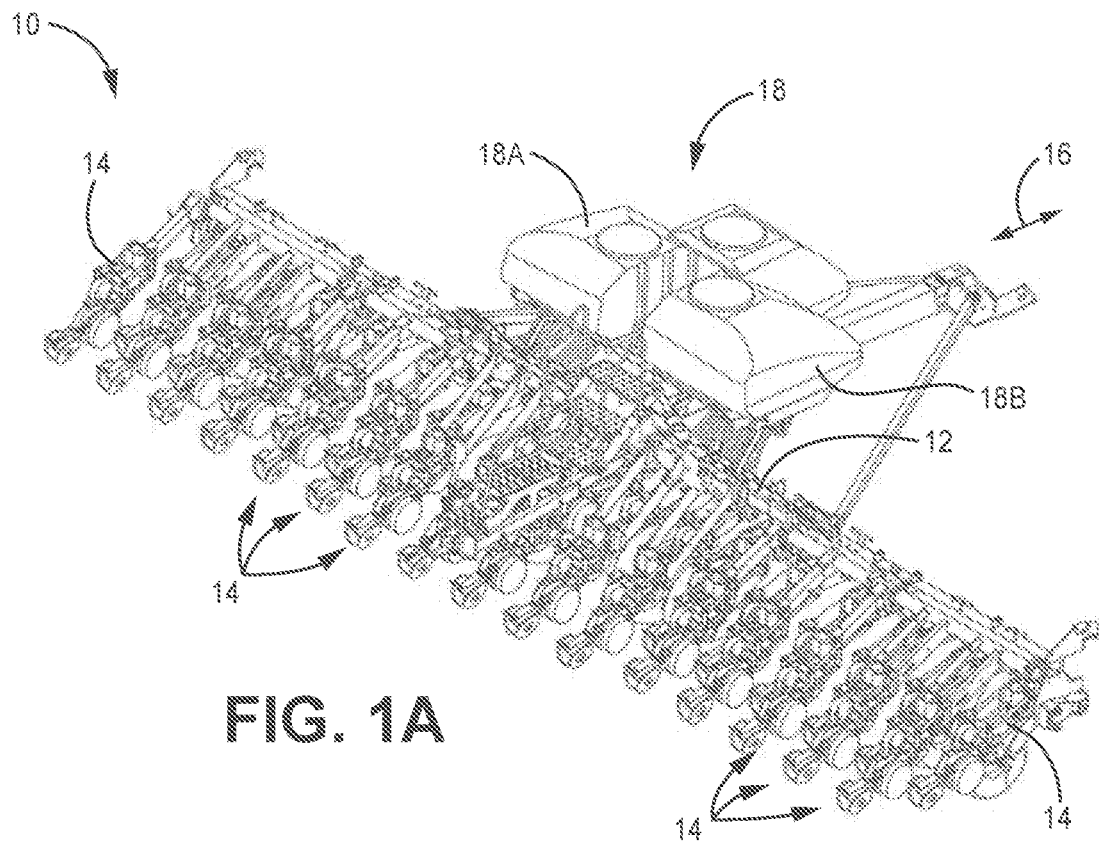
FIG. 1A is a perspective view of a planting system, according to one embodiment.

FIG. 1A depicts an exemplary planter or seeding machine 10 that, according to one embodiment, can have a seed delivery system with a seed spacing device as disclosed or contemplated herein. The planting machine 10 in this specific implementation is a row crop planter 10 having a central crossbar 12 and multiple planting row units 14 mounted to the crossbar 12. At least one hopper (also referred to herein as a "storage tank") 18 is disposed on the seeding machine 10 to hold seed and is fluidically coupled to unit hoppers (also referred to as "mini-hoppers") (such as hopper 34 as discussed below) on each planting unit 14 such that seed can be delivered pneumatically from the hopper 18 to a unit hopper (such as hopper 34) on each unit 14. Alternatively, the planter 10 has two hoppers 18A, 18B as shown. In a further alternative, any known hopper or seed retention device configuration can be incorporated into the planter 10 and the separate units 14 and function with the seed delivery system embodiments herein. It is understood that, generally, the row units 14 on a particular planter (such as exemplary planter 10) are typically identical or substantially similar. The seeding machine 10 moves forward and backward via the fore-aft direction shown by the arrow 16.

Figure 1B:
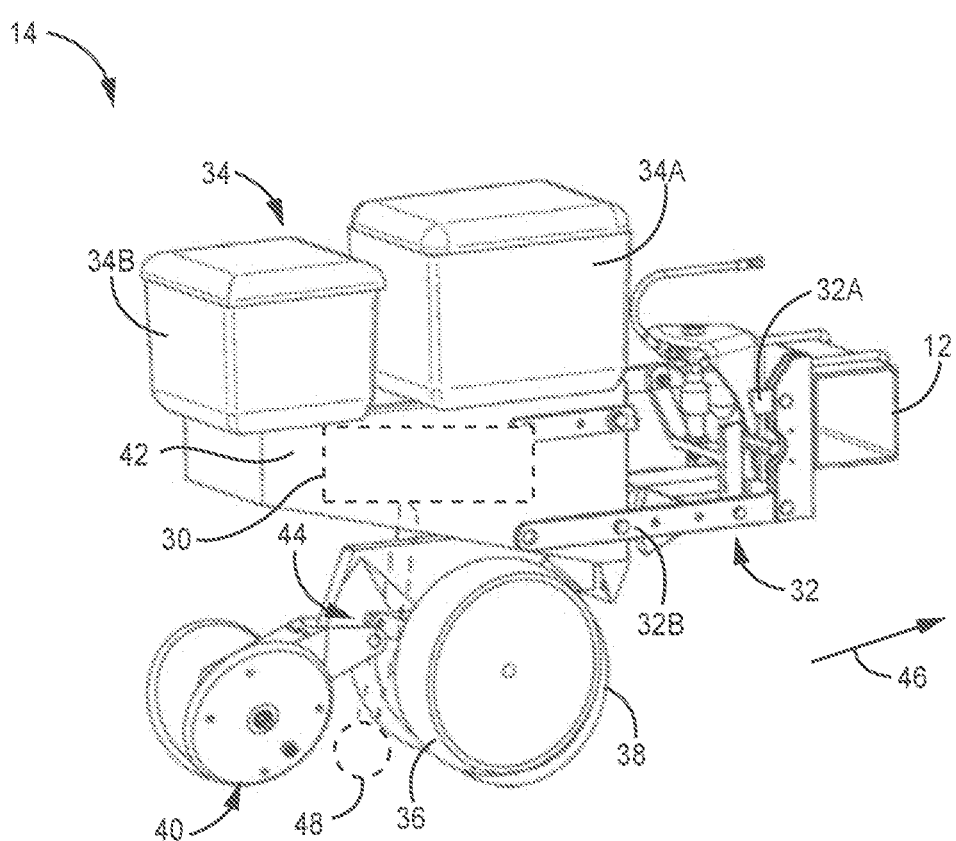
FIG. 1B is a perspective view of a row unit for a planting system, according to one embodiment.
Figure 1C:
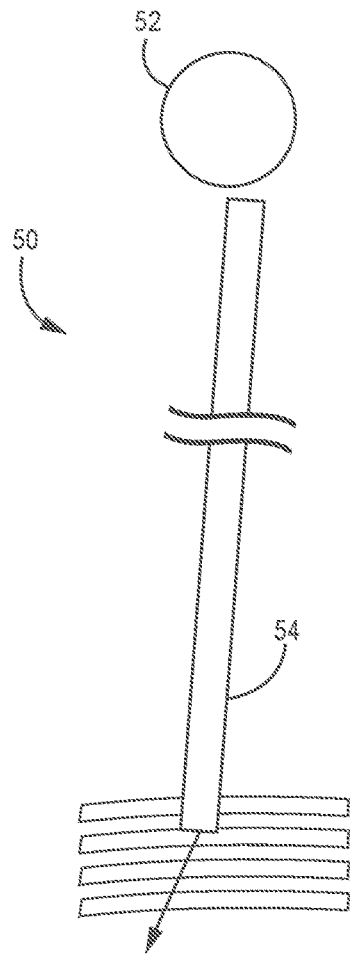
FIG. 1C is a schematic depiction of a prior art seed delivery device that utilizes gravity.
Figure 1D:
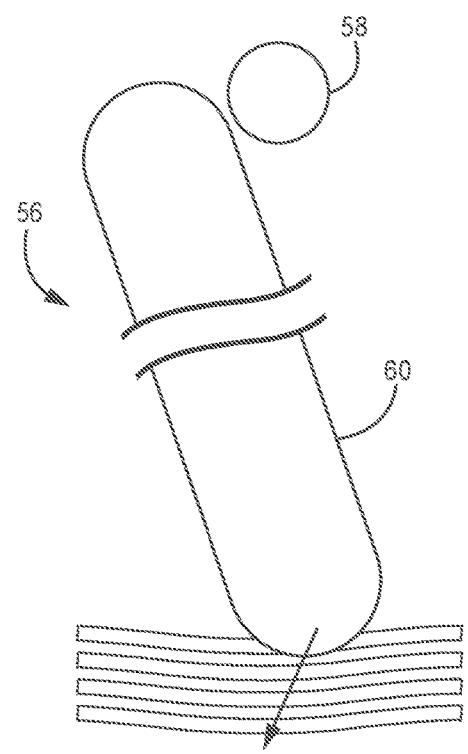
FIG. 1D is a schematic depiction of a prior art seed delivery device utilizing a mechanical delivery device.
Figure 1E:
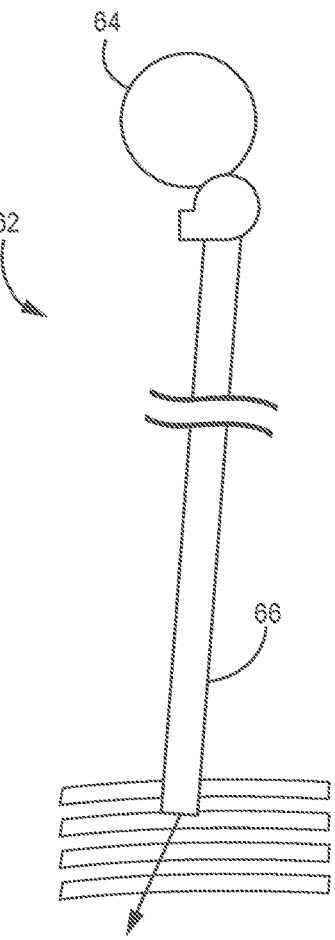
FIG. 1E is a schematic depiction of a prior art seed delivery device utilizing pressurized air.

One example of a row unit 14 having a seed delivery system 40 with a seed spacing device 48, according to one embodiment, is depicted in greater detail in FIG. 1B. It is understood that any seed delivery and spacing system according to any embodiment disclosed or contemplated herein (such as system 40 with spacing device 48) can be incorporated into any known row unit having any configuration. This particular exemplary row unit 14 is jointedly coupled to the central crossbar 12 via a parallelogram linkage 32 made up of two linkage arms 32A, 32B such that the individual units 14 are vertically moveable by a predetermined amount relative to the crossbar 12. The exemplary row unit 14 in this implementation has known components, including a seed meter 30, a hopper 34, gauge wheels 36 (controlling the depth of the furrow), furrow opening disks 38 (to form an open furrow in the soil beneath the seeding machine into which seed is deposited), and a closing and packing wheel (or wheels, in this specific example) 40 (to close the furrow over the deposited seed and to firm the soil in the closed furrow), as are generally understood in the art. Alternatively, any similar known components or features or additional known features or components can be incorporated into the row units 14. According to certain embodiments, including the exemplary embodiment as shown, the hopper 34 is made up of at least two hoppers 34A, 34B. For example, in one implementation, the hopper 34 is made up of one seed hopper 34A and a chemical hopper 34B, such that the seed hopper 34A contains seed and the chemical hopper 34B can contain a herbicide, insecticide, or any other known chemical for application while planting, including any combination thereof. Alternatively, any known combination of hoppers can be incorporated herein. In this implementation, the seed metering system 30 is disposed on the row unit 14, and more specifically, coupled to, or disposed within, the frame member 42 thereof, such that it can be in operable communication with the hopper 34 and the seed delivery system 44. The frame member 42 is jointedly coupled to the parallelogram linkage 32. The seed is stored or retained in the seed hopper 34 and provided to the seed meter 30. In one implementation, the seed hopper 34 is coupled to the seed metering device 30 via a tubular connection (which can be referred to herein as a "seed feeding tube") (not shown). The seed meter system 30 singulates the seed and transfers it to the delivery system 44, which carries the seed into a planting furrow, or trench, formed in the soil by furrow opening disks 38. It is understood that the seed delivery and spacing system embodiments as disclosed or contemplated herein (including system 44) can be coupled to and operate with any known seed metering system, including any mechanical, electromechanical, air assist, positive air pressure, or vacuum metering systems. The crossbar 12 and row unit 14 are designed to be moved over the ground in a forward working direction identified by arrow 46.

Thus, it is understood that the various seed delivery and seed spacing implementations disclosed or contemplated herein can be incorporated into any known planters or planting systems, and further can be incorporated into each row unit therein.

Figure 2:
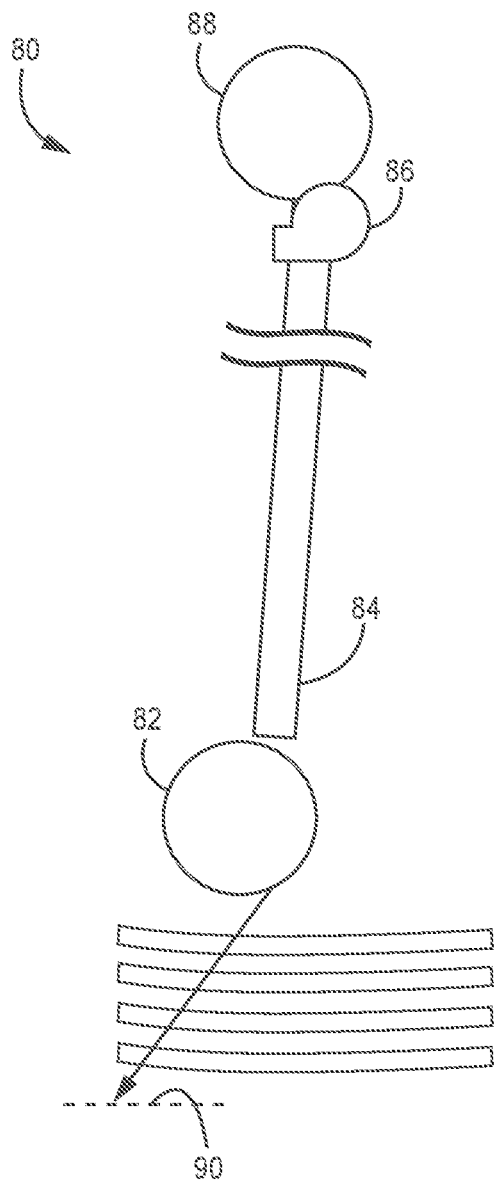
FIG. 2 is a schematic depiction of a seed delivery device having a seed spacing device, according to one embodiment.

One embodiment of a seed delivery system 80 with a seed spacing device 82 is depicted schematically in FIG. 2. In addition to the seed spacing device 82, the delivery system 80 generally also has a delivery tube 84 and an air pressure source 86 that generates air pressure to urge seeds distally along the tube 84 toward the seed spacing device 82. It is understood that the air pressure source 86 in this embodiment and any other seed delivery system embodiment disclosed or contemplated herein can be any known air pressure source 86, including, in some cases, the same air pressure source that is used to supply air pressure in the seed metering device. Alternatively, instead of an air pressure source, this embodiment or any other embodiment herein can have a vacuum source that is used for the same purpose—to urge seeds from a proximal end of the seed tube 84 toward and into the seed spacing device 82. In a further alternative, mechanical devices or methods can be incorporated (instead of pressurized air) to accelerate the seed distally/downward toward the seed spacer 82. For example, the mechanical delivery device can be an accelerator wheel or other such device that can strip the seed from the seed meter and urge it toward the seed spacer 82.

The provision of pressurized air from the air pressure source 86 into the seed tube 84 such that the pressurized air is directed distally along the tube 84 toward the seed spacing device 82 creates a downward (or distal) airflow inside the tube 84. As such, each seed that is transferred from the seed meter 88 into the tube 84 is urged along the tube 84 toward the seed spacing device 82. This use of generated forces (via the force of air on the seed) can basically urge each seed at a predetermined velocity to reduce or eliminate the issues caused by relying solely on gravity, as described above.

At its proximal end, the seed tube 84 is adjacent to, coupled to, or otherwise in communication with a seed meter 88 as shown. It is understood that the singulation of the seeds occurs at the seed meter 88, and that the seed delivery system 80 (or any other delivery system embodiment disclosed or contemplated herein) can operate in conjunction with any known seed metering system, including any such system in combination with any type of planting system, including both conventional, precision, and/or high-speed planting systems. Two specific examples of commercially-available precision planting systems that can be incorporated into any planting system containing any seed delivery system herein are the INCOMMAND™ and/or SEEDCOMMAND™ precision agricultural systems available from Ag Leader Technologies in Ames, IA.

In this embodiment as shown in FIG. 2, the seed spacing device 82 is depicted schematically to represent any possible spacing device embodiment. Each seed spacing embodiment as disclosed or contemplated herein is a device or component that is in communication with the distal end of the tube 84 such that the device 82 catches or otherwise receives each seed as the seed reaches and exits the distal end of the tube 84 and thus enters the spacing device 82. The device 82 is also disposed on the seed delivery system 80 such that it is adjacent or otherwise fairly near to the seed furrow 90 in the soil such that each seed ejected from the seed spacing device 82 is thereby urged toward and into the furrow 90. Thus, the seed spacer 82 and each spacer embodiment disclosed or contemplated herein is configured to eject each singulated seed received from the seed tube 84 into the seed furrow 90. Further, the spacer 82 and each such embodiment herein can be controlled to adjust the delivery of the seed into the furrow 90 in a controlled fashion. As such, the seed spacing apparatus 82 receives and then ejects each seed into the furrow 90 according to a selectable rate that is controllable. Various seed spacing device embodiments are discussed in additional detail below.

Another characteristic of the various seed delivery system embodiments disclosed or contemplated herein is the separation of the seed singulation (in the seed meter, such as meter 88) and the seed spacing (in the seed spacing device, such as device 82). That is, the various seed delivery embodiments separate singulation and spacing both functionally (dividing those functions between the meter and the spacing device) and spatially (such that singulation occurs at the meter disposed adjacent to the proximal end of the delivery tube and spacing occurs at the spacing device adjacent to the soil surface). As such, while various known seed metering and delivery systems combine the seed singulation and spacing in the seed meter, the various implementations herein provide for both functional and spatial separation of those functionalities. Thus, in the various embodiments herein, control of seed singulation at the meter (such as meter 88) is fully and physically separated from control of seed spacing at the seed spacer (such as spacer 82) near the furrow.

The separation of seed singulation and seed spacing in the various seed delivery implementations disclosed or contemplated herein provides advantages for the planting of seeds. For example, the spacer (such as spacer 82) can be controlled based on the planter velocity to eject each seed at a speed that results in little or no offset from the planter velocity, resulting in minimal bounce of the seed in the furrow. Thus, the separation of seed singulation and seed spacing control allows for intentionally manipulating either singulation or spacing, or both, with greater control and variation than if both singulation and seed spacing were controlled at the seed meter (as is generally true of most known seed metering and delivery systems). For example, the seed meter (such as meter 88) might be operated faster than usual. Singulated seed could then be accelerated quickly to the seed spacer (such as spacer 82) and be received there such that the seed can be retained in the spacer (such as spacer 82) for a predetermined period of time before the spacer ejects the seed into the furrow, which is referred to herein as a "dwell time." As will be discussed in further detail below, "dwell time," as used herein, is intended to refer to the amount of time that the spacing device (such as spacer 82) is not rotating or otherwise moving and able to accept a seed from the seed meter (such as meter 88) via the delivery system. Thus, the acceleration of the seed through the tube (such as tube 84) and into the spacer (such as spacer 82) makes it possible to have an intentional "dwell time" at the seed spacer mechanism that can be used advantageously in the control of seed spacing at the trench, as will be discussed in further detail below. This further allows flexible adjustability of the parameters used to then operate the spacer to match or operate in conjunction with planter velocity. Various sensors and controllers can be used to accomplish this according to various embodiments, as will be discussed in additional detail below.

Figure 3:
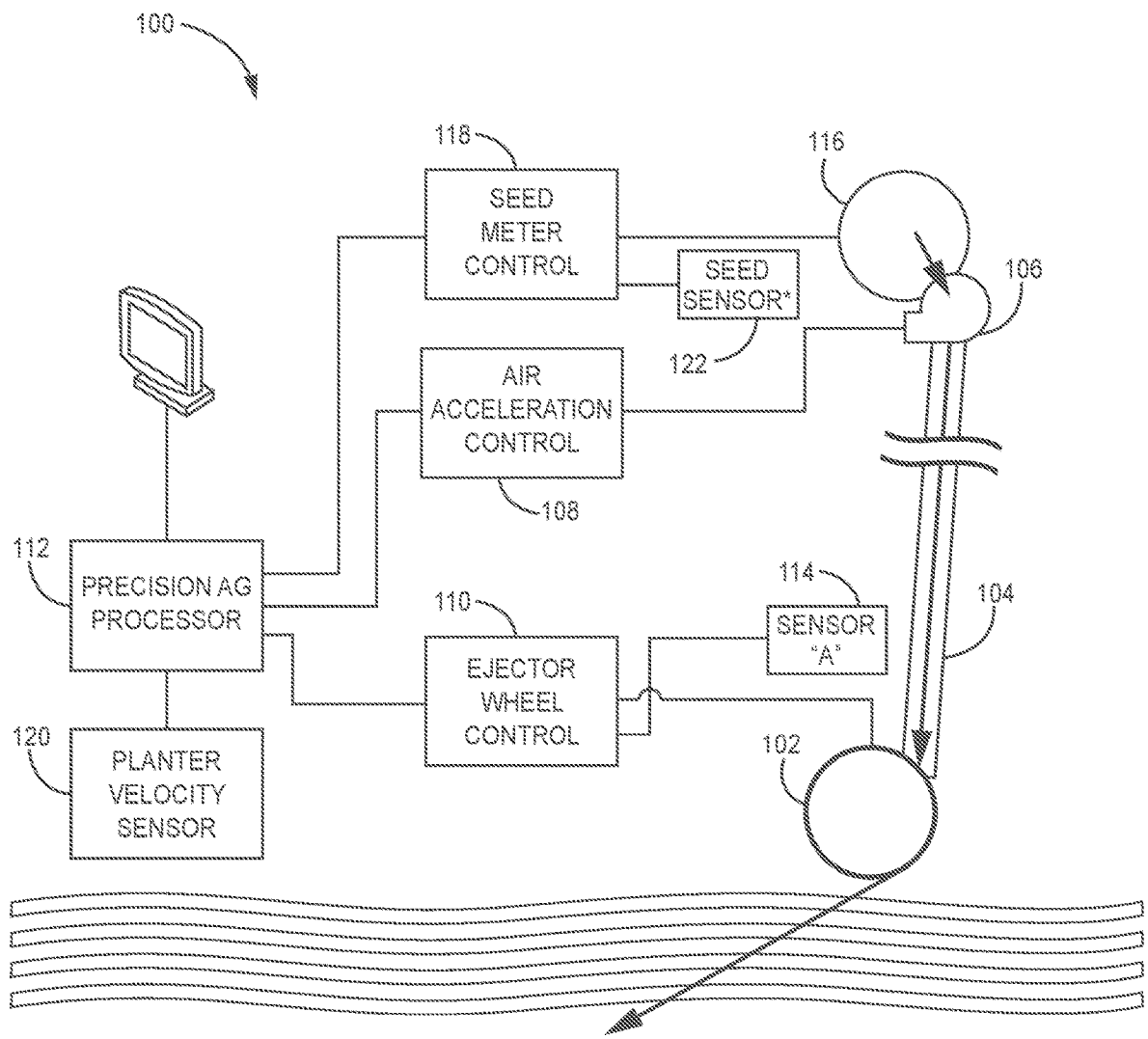
FIG. 3 is a schematic depiction of a seed delivery system having a seed spacing device, according to one embodiment.

Another implementation of a seed delivery system 100 with a seed spacing device 102 is depicted in FIG. 3. This system 100 embodiment incorporates various controllers and sensors that can be used to operate the system 100 in conjunction with other systems of a planting system and coordinate with the planting system (with respect to speed and other parameters). In addition to the spacing device 102, the seed delivery system 100 also has a delivery tube 104, an air pressure source 106 that generates air pressure to urge seeds distally along the tube 104 toward the seed spacing device 102, a pressure source controller 108 in communication with the air pressure source 106, and a spacing device controller 110 in communication with the seed spacing device 102. Further, in certain embodiments, the two controllers 108, 110 are in communication with a planting system controller 112 such that the planting system controller 112 can cooperate with or coordinate the operation of the controllers 108, 110 for purposes of coordinating seed delivery with the other operations of the planting system. In one embodiment in which the planting system is a precision planting system, the controller 112 is a precision planting system controller 112.

In addition, certain embodiments of the system 100 can also have various sensors that provide information useful for operation of the overall planting system, including population monitoring and providing feedback to the operator and/or the system controller 112. One such exemplary sensor is a seed detection sensor 114 disposed at or near the inlet (not shown) of the seed spacer device 102, which can detect the presence of a seed at the inlet to the seed spacer 102. It is understood that other known sensors can be incorporated into the seed delivery system 100, and further into the planting system as a whole. For example, as shown in FIG. 3, a planter velocity sensor 120 is in communication with the planting system processor 112 such that the processor 112 can monitor the speed of the planting system overall and use that information to help control seed metering and spacing, as described in additional detail below.

Additional examples of known sensors that could be incorporated (and/or used as the seed detection sensor 114) include proximity sensors, such as the commercially-available sensor identified as Model #CM12-08EPB-KC1, which is available from SICK Sensors of Sick USA, which is located in Minneapolis, MN.

While not part of the seed delivery system 100 itself, the overall planting system obviously includes a seed meter 116 that is in communication with a meter controller 118 such that the seed meter 116 singulates and transfers seeds to the seed tube 104 in a fashion discussed above. The controller 118 can control the operation of the seed meter 116, thereby controlling the speed at which seeds are singulated and transferred into the seed tube 104. Further, a seed sensor 122 can also be provided, which can be placed next to or in the opening (not shown) between the seed meter 116 and seed tube 104 such that the sensor 122 detects each seed being transferred from the meter 116 into the seed tube 104. Alternatively the sensor 122 can be positioned anywhere near the meter 116 such that the sensor can detect any seed being transferred into the seed tube 104. The seed sensor 122 is in communication with the meter controller 118.

The pressure source controller 108 controls the amount of air pressure generated by the air pressure source 106 and thereby controls the speed at which each seed is urged distally/downward along the tube 104 toward the seed spacing device 102. In certain implementations, the controller 108 is set to provide air flow that urges each seed to be transported along the tube 104 at a speed that exceeds the speed that gravity would impart (thereby making dwell time at the spacer 102 possible as discussed in further detail above and below). In further embodiments, the set air flow speed is such that each seed is urged distally at a speed that is significantly higher than the speed resulting from gravity.

It is understood that any of the controllers as disclosed or contemplated herein in any of the various embodiments can be any type of processor that can be used to control any of the components in the various systems herein. For example, each controller can be a microprocessor, a computer, or any other type of processor that might be used in a known planting system.

In use, the meter controller 118 controls the seed meter 116 such that the meter 116 operates at a speed that provides the seeds into seed delivery system 100 at the appropriate speed and singulation to result in the desired planting population. To accomplish this, the meter 116 speed must be coordinated with the operation of the spacing device 102 (and the planting system as a whole). That is, the meter controller 118 must communicate with and coordinate with the spacing controller 110, which occurs via the planting system controller 112 in this specific embodiment. Alternatively, the two controllers 110, 118 can communicate directly. Thus, in certain embodiments, the meter seed sensor 122 can be used to detect the transfer of each seed from the meter 116 into the seed delivery tube 104 and communicate that information to the meter controller 118, which can communicate the information to the planting system controller 112 (or the sensor 122 can communicate directly with the controller 112). The controller 112 can use the seed detection information to predict or anticipate the arrival of the seed at the seed spacing device 102 (via passage along the tube 104). Further, the spacer controller 110 can be in communication with the system controller 112 and provide spacer 102 information such that the system controller 112 can compare the expected arrival time of the seed at the spacer 102 with the operating frequency of the spacer 102. As a result, the system controller 112 can communicate with the meter controller 118 or directly with the meter 116 to either advance or retard the rotation of the seed meter 116 to achieve or maintain the optimal seed delivery timing to the seed spacing device 102. Of course, it is understood that this meter sensor 122 can also be used to provide planter monitoring functions like actual population, skips, multiples, etc. (or it could be two or more sensors that monitor these parameters).

Alternatively, or additionally, the system controller 112 can communicate with the air pressure controller 108 or directly with the air pressure source 106 to either increase or decrease the air pressure provided to the seed tube 104 to further control the seed delivery timing to the seed spacing device 102. The acceleration of each seed by air pressure (or other means) through the tube 104 can help increase the available time window (dwell time) that the seed is present at the seed spacer 102, thereby allowing proper spacing to be achieved with the seed spacer 102. In other words, accelerating the seed along the seed tube 104 toward the spacing device 102 creates a larger separation between each seed and negates the adverse effects of relying entirely on gravity, such as vertical row unit movement and the like.

Thus, the meter controller 118, the air pressure controller 108, and the spacing controller 110 can all work together to control the metering, delivery, and spacing of each seed as described above. In the specific embodiment herein, the planting system controller 112 also operates in conjunction with the other three controllers 118, 108, 110 to accomplish the metering, delivery, and spacing, along with controlling the entire planting system. As such, it is understood that the controllers 118, 108, 110, 112 function together to operate the seed metering, delivery, and spacing as described above, while also allowing for increasing or decreasing the action of the various components (the meter 116, the air pressure from the generator 106, and the spacing device 102) to allow for changes in the planting unit speed, desired population rates, etc.

Figure 11:
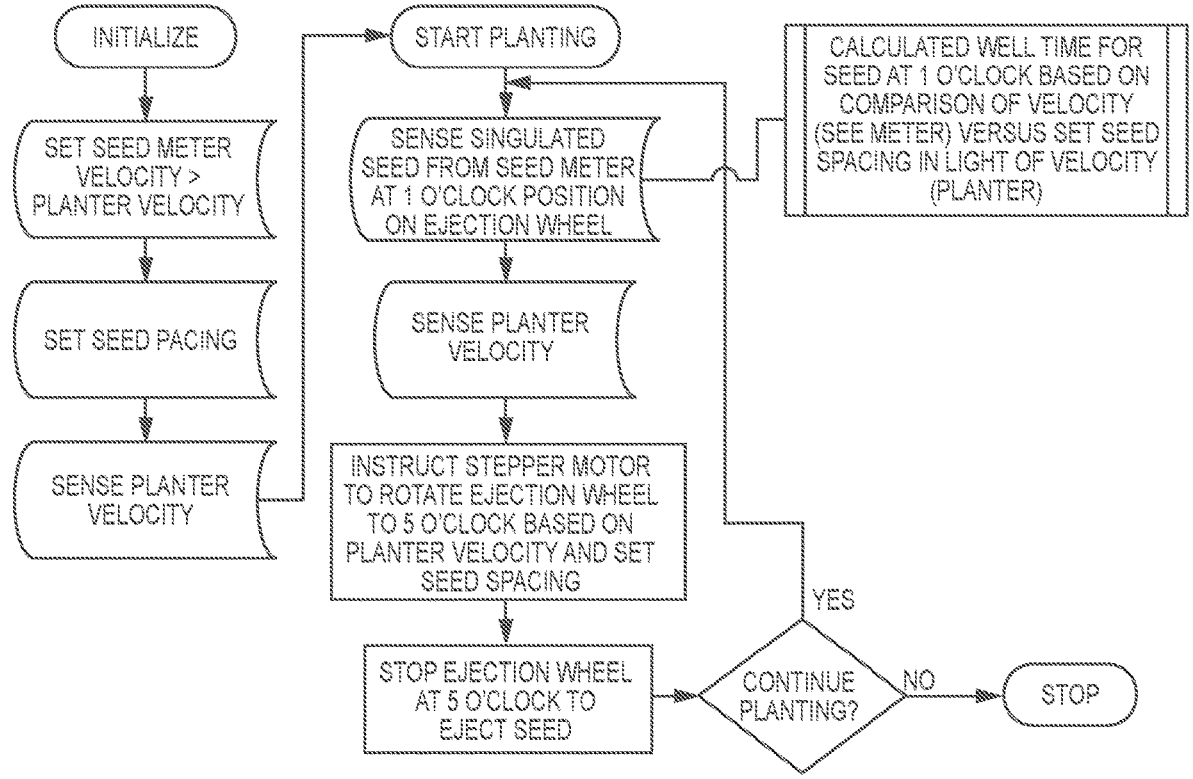
FIG. 11 is a flow chart illustrating one example of how a seed delivery and spacing system can be initiated and operated according to one embodiment.

FIG. 11 depicts a flow chart describing the operation of the seed delivery system 100 of FIG. 3, according to a further embodiment. As indicated in the flow chart, the controller(s) can calculate any intentional offset of seed meter from ejector wheel rate to provide the desired or necessary dwell time or tolerance. As set forth in the figure, according to one embodiment, initialization would include setting or sensing a seed meter rate and seed spacing. Planter velocity could be obtained from a precision ag system from its navigation section or otherwise. The processor would be programmed with the relevant information to calculate the needed ejector wheel cycle timing and rotation speed on a continuous basis. The motor would then be instructed accordingly to start (or accelerate) and stop (or decelerate) as described herein with respect to various embodiments. This process continues throughout the planting process until the process is discontinued manually, planting is discontinued, or the planter is stopped. It is understood that precision ag equipment can allow manual, semi-automatic, or automatic instructions of the same.

Of course, it is understood that the spacer controller 110 can be used independently to adjust the action of the seed spacer 102 and thereby modify seed spacing in the furrow, and these adjustments can be independent of the control of the seed meter 116 and/or the air pressure generator 106. Alternatively, as discussed in detail above, control of the seed meter 116, air pressure generator 106, and the seed spacer 102 can be coordinated according to predetermined relationships for beneficial results, as discussed above.

It is understood that any of the various features, components, and interactions of the seed delivery system 100 and the associated planting system overall as described in detail above can be incorporated into any other seed delivery or planting system embodiment disclosed or contemplated elsewhere herein.

Figure 4:
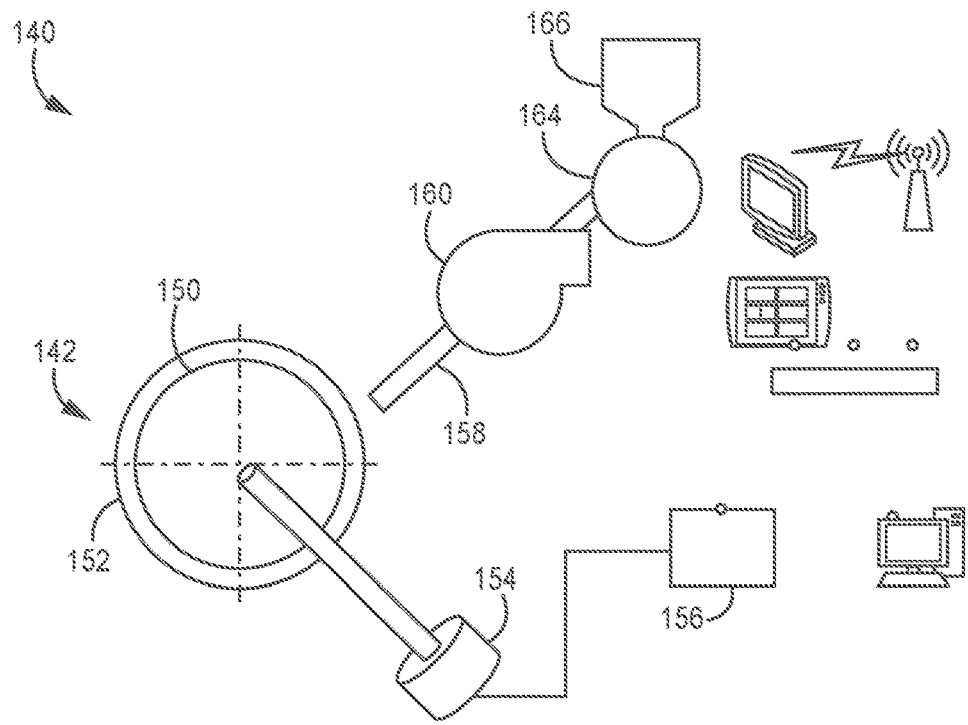
FIG. 4 is a schematic depiction of a seed delivery system having a seed spacing device, according to another embodiment.
Figure 5:
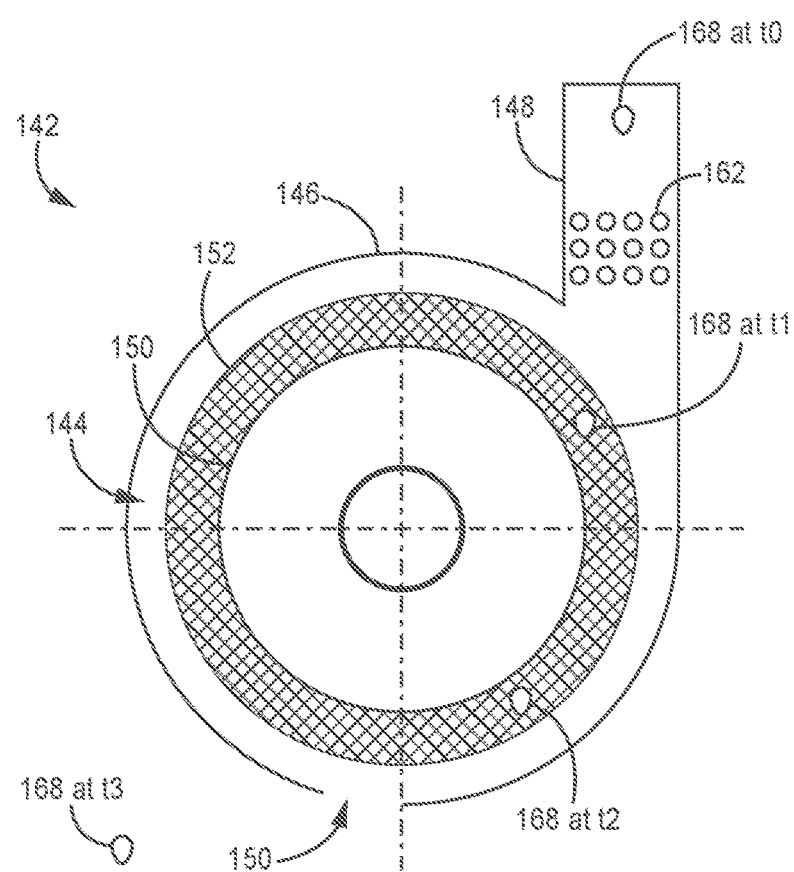
FIG. 5 is a cross-sectional side view of the seed spacing device of FIG. 4, according to one embodiment.

One specific type of seed spacing device 142, according to one embodiment, is depicted in FIGS. 4 and 5, which shows a seed delivery system 140 having a seed spacing device 142 that has, in this embodiment, an ejector wheel 144. The seed spacing device 142 has a housing 146, a seed intake channel 148, and seed ejection opening 150 defined in the underside of the housing 146. The ejector wheel 142 is rotatably disposed within the housing 146 and has a core (also referred to as a "drum" or "base wheel") 150 and multiple fingers or bristles 152 extending outward from the outer peripheral surface of the core 150. It is understood that, according to certain embodiments, the ejector wheel 142 is structurally similar to known brush wheels. As best shown in FIG. 4, the ejector wheel 142 is coupled to a motor 154 that powers the starting, stopping, and rotation of the wheel 142. The motor 154 is coupled or in communication with a spacer controller 156 (which, in certain embodiments, can be similar in functionality to the spacer controller 110 discussed above) such that the controller 156 can control the motor 154 and thereby control the wheel 142 to control spacing of the seeds as described in further detail above.

In this specific embodiment, the motor 154 is a stepper motor 154. Alternatively, the motor 154 can be any known motor that can urge the wheel 142 to cyclically rotate for a partial rotation and immediate stop, as will be discussed in further detail below. Further, the motor 154 (and any motor for powering any spacing device according to any embodiment herein) can be any known actuator, such as a direct drive actuator or otherwise. Other specific known types of motors that can be used can include DC Servo or Brushless DC motors, for example. A commercially-available example of each is as follows: DC servo motor Model #M66CE-12, which is available from Mclennan, in Surry, United Kingdom; and brushless DC motor Model #BLY171S-15V-8000, which is available from Anaheim Automation, in Anaheim, CA (USA).

It is understood that the bristles or fingers 152 operate in a fashion similar to other known brush wheels or brush belts incorporated into various planter technologies such that a seed can be disposed within the bristles/fingers 152 and retained therein, but also such that the seed can be ejected when sufficient force is used.

With respect to the entire seed delivery system 140 as best shown in FIG. 4, in addition to the seed spacing device 142, the system 140 has a seed delivery channel (or "tube" or "lumen") 158 and an air pressure generator 160 coupled thereto. The seed intake channel 148 of the seed spacing device 142 is coupled to or otherwise in communication with the seed delivery channel 158 such that each seed transported distally/downward along the channel 158 is ultimately transported into the seed intake channel 148. Further, the intake channel 148 has venting or exhaust openings 162 defined in the wall of the intake channel 148 such that the interior lumen of the channel 148 is in fluidic communication with the air external to the channel 148. Because the intake channel 148 is coupled to the seed tube 158 and the seed tube 158 has air flow passing therethrough, the venting openings 162 provide an exit for the pressurized air passing through the tube 158, thereby helping to maintain a lower or normal air pressure in the seed spacing housing 146. Of course, in addition to the seed delivery system 140, the planting system also has a seed meter 164 that receives seed from a seed hopper 166 and singulates the seeds into the seed delivery system 140.

As has been discussed elsewhere, the seed spacing device 142 is disposed near or adjacent to the soil surface such that ejection of each seed out of the ejection opening 150 results in the seed not having to travel a great distance before landing in the furrow, thereby reducing the risk of the seed rolling or otherwise moving once it lands in the furrow, thereby reducing seed spacing issues.

The following is a description of the operation of the seed delivery system 140 and the seed spacing device 142. While the description will focus on the system 140 of FIGS. 4 and 5, it is understood that the general operation and the general functionality applies to any of the other various seed spacing device embodiments disclosed or contemplated herein.

In operation, the seed delivery system 140 and the seed spacing device 142 operate in the following fashion. Each seed is delivered from the hopper 166 to the seed meter 166, which singulates the seed into the seed delivery system 140. As best shown in FIG. 5, the seed is urged distally/downward along the seed tube 158 toward and ultimately into the seed intake channel 148, where the seed 168 is disposed at time zero (t0). The seed is urged through the tube 158 via a flow of air generated by the pressurized air source 160 with sufficient velocity to ensure that only one seed is disposed in the tube 158 at any one time. As the seed is passed through the channel 148 and into the bristles or fingers 152 such that the seed is retained therein at t1 (which is generally the 1 o'clock position in the rotation of the wheel 144), the ejector wheel 144 is at 0 rpm. The pressurized delivery air is discharged through the venting openings 162 to the atmosphere as discussed above.

At the correct time based on forward travel of the planting system and the desired seed spacing in the furrow, the controller 156 causes the stepper motor 154 to accelerate the ejector wheel 144 and, thus, the seed 168 disposed therein, to a rearward velocity equal to the forward travel speed of the planter. In this example, the rotation direction of the wheel 144 as depicted in FIG. 5 is clockwise so the seed 168 will be rotated from the 1 o'clock position at t1 downward to the 5 o'clock position at t2. At this point in the rotation, the controller 156 rapidly decelerates the ejector wheel 144 to 0 rpm. The seed 168 still has momentum and thus continues in a direction tangent to the wheel 144 at the speed the wheel 144 was rotating before it stopped. Thus, the seed 168 is propelled out of the housing 146 through the opening 150 and into the seed furrow at t3.

Figure 9A:
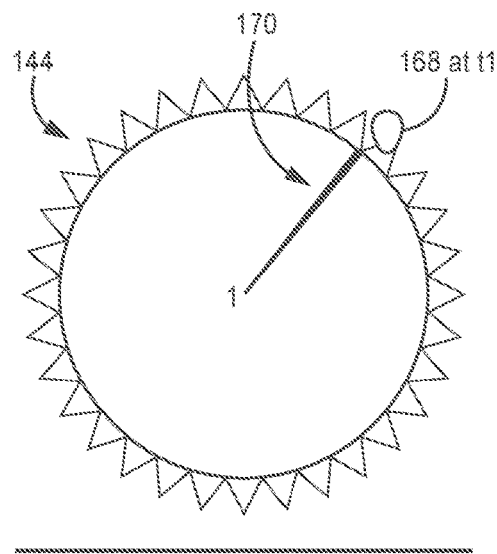
FIGS. 9A, 9B, and 9C are schematic depictions of an ejection wheel from a seed spacing device in the typical rotational positions for receiving and ejecting seeds.
Figure 9B:
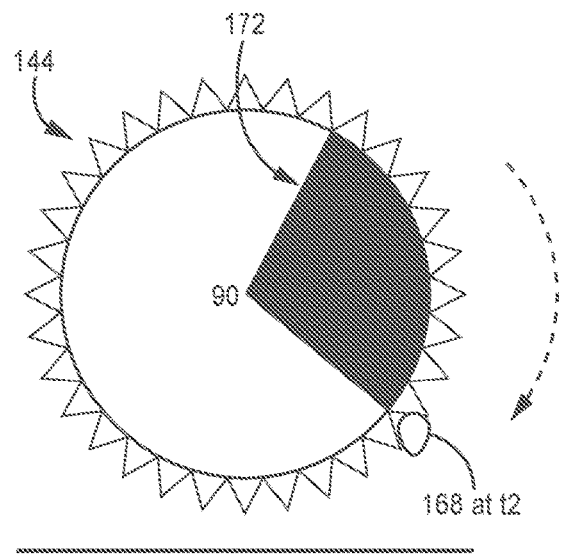
Figure 9C:
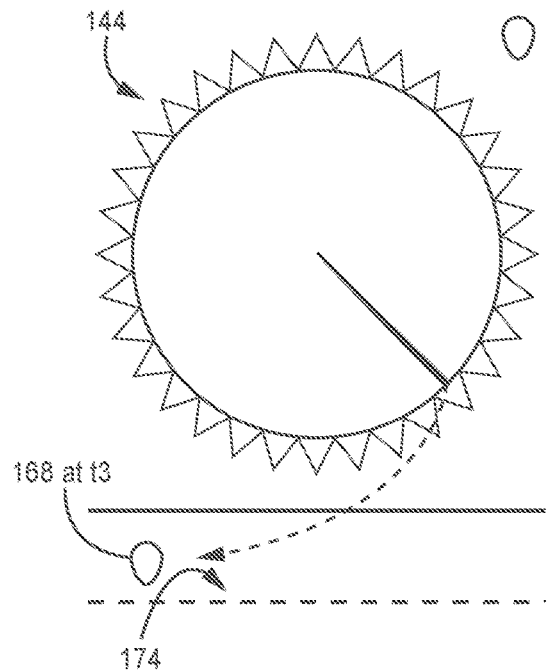

The cyclical, partial rotation of the wheel 144 is depicted schematically in further detail in FIGS. 9A-9C. That is, FIG. 9A depicts the wheel 144 and seed 168 at t1, FIG. 9B depicts the wheel 144 and seed 168 at t2, and FIG. 9C depicts the wheel 144 and seed 168 at t3. After the dwell time when the seed 168 is disposed at t1, the wheel 144 is rotated at a preset rotational velocity from the 1 o'clock position 170 (as shown in FIG. 9A) to the 5 o'clock position 172 (as shown in FIG. 9B) and then is abruptly stopped. When the wheel 144 is stopped at position 172, the seed continues to travel (as a result of inertia) in a tangential direction through an outer opening of a housing (such as the opening 150) and is delivered into the target seed furrow 174 as the planter moves through the field.

At the same time, in this example, a new seed 168 is delivered into the housing 146 through the channel 148 and into the bristles or fingers 152 at t1 and is disposed there until the wheel 144 rotation begins again. Alternatively, it is understood that the system 140 can be configured to load more than one seed at a time into the wheel 144.

Thus, the ejector wheel 144 goes through a sequence of rotational motions that establish the spacing of the seed 168 in the furrow. That is, the seed 168 is transported from the seed meter 164 through the seed tube 158 and into the seed spacing wheel 144 at the appropriate time, at which point the wheel 144 is rotated (about ⅓ of a full rotation, in certain embodiments) such that the seed 168 is accelerated to match the travel speed of the planter and then ejected to the seed furrow, thereby establishing accurate spacing.

It is understood that the characteristics, features, and operation of this seed spacer 142 and motor 154 can be incorporated into any of the embodiments disclosed or contemplated herein. Thus, many implementations include a motor or actuator (such as motor 154) with highly precise and repeatable control that can start and stop the spacing wheel (such as wheel 144) at the required rate and frequency to sequentially eject seeds at the planter-velocity-matched-rate and at the required cycle times to meet modern planter speeds and seed spacings (which are understood to be antagonistic with one another in the sense that planter speeds are increasing and seed spacing is decreasing). Thus, in the various embodiments herein, the spacing wheel (such as wheel 144) can receive at least one singulated seed in the wheel's stationary state. The actuator (such as motor 154) can quickly accelerate the wheel and a seed over a partial rotation and abruptly stop the wheel. Momentum ejects the seed from the wheel to the seed furrow. Once the first seed is delivered to the furrow, the wheel (such as wheel 144) receives the next seed while still in its stopped state and then is accelerated and stopped according to the next cycle such that the next seed is ejected. This receive-start-stop-eject cycle is repeated at relatively high frequencies to meet preset seed spacing for present planter velocities.

In this embodiment and the other implementations disclosed or contemplated herein, the seed spacing accuracy is achieved because the seed 168 is delivered to the spacing wheel 144 more quickly than is possible if relying solely on gravity. Accelerating the seed travel to the ejector wheel 144 creates the dwell time (mentioned above) for the seed to be correctly spaced and delivered to the furrow under controlled conditions and eliminates any inaccuracies that might be caused by seed shape and air speed velocity. Based on the definition above, "dwell time" in the instant example is the amount of time that the spacing wheel 144 is not rotating and able to accept a seed 168 at t1 from the seed meter 164.

The application of air flow in the seed tube 158 makes it possible to deliver seed 168 to the seed spacing device 142 while the spacing device 142 is at rest, thereby making the dwell time possible. That is, the ability to accelerate the seed 168 toward and into the seed spacing device 142 at a speed faster than possible based solely on gravity makes it possible to create dwell times that can be used to space the seeds as desired in the furrow. This can be further understood by considering the following non-limiting real-world example. To deliver the seed 168 to the seed spacing device 142 with sufficient speed to ensure the seed 168 is disposed in the spacing device 142 during the dwell time, the critical factor is velocity. Assuming the planting system is operating at maximum capacity and the seed spacing wheel 144 needs to cycle 36 times per second at maximum capacity, that means it must cycle every 0.0278 second (because ⅟₃₆ equals 0.0278). Assuming the seed tube 158 is 18 inches in length such that the seed 168 needs to travel 18 inches from the time it leaves the seed meter 164 to the seed spacer 142, then the seed 168 must travel in excess of 36.82 miles per hour.

This is because the seed must travel 648 inches per second (because 18×36=648 inches/second), which means it must travel 54 feet per second (because 648/12=54 feet per second), which means it must travel 3,240 feet per minute (because 54×60=3240 feet per min), which means it must travel 36.82 miles per hour (because 3240/88=36.82 MPH, because 1 mph=88 ft/min). Rounding up in this example, this means the seed 168 must to travel at at least 40 miles per hour to cover the 18 inch distance to the seed spacer 142 before the next seed is released from the singulating seed meter 164. While this speed seems fast, it is similar to the speed in feet/sec that known pneumatic grain conveyors can convey grain.

At this point, for improved understanding, a specific example of the operation of a seed spacing device (such as device 142) is set forth as well. Assuming a target seeding population rate of 35,000 seeds/acre and a forward planter travel speed of 10 miles per hour, the ejector wheel 144 would be required to operate at 30 Hz. Assuming each seed spacing cycle as described above is ⅓ of a complete revolution of the wheel 144, the revolutions per second would be 10 (or an average of 600 RPM), which is well within the limits for motors such as a stepper motor (like stepper motor 154), or other known motors with at least similar controllable operation. In order for the wheel 144 to accelerate the seed 168 to match the forward travel speed of the planter, the motor 154 must briefly reach an RPM determined by the outer diameter ("OD") of the ejector wheel 144 (or the diameter at which the seed is retained in the wheel 144) and the forward travel speed of the planter. For example, if the ejector wheel 144 OD is 2.5" and the travel speed of the planter is 10 mph, then the motor 154 will need to accelerate to 1350 RPM from 0 in each cycle. It is understood that that speed is also within normal operating boundaries for a stepper motor like motor 154. For example, at 36 cycles per second, each full cycle will last 0.0278 seconds. The time for the motor 154 to go from start to stop in that same period is 0.0234 seconds. This means a dwell time of 0.0044 seconds (because 0.0278−0.0234=0.0044 seconds). This includes both the acceleration time to match the planter ground speed and the braking time to stop, all within the 120-degree rotation. If the planter ground speed slows and/or the seeding rate declines, the dwell time increases because the time per full cycle increases, but the time the motor is operating does not change substantially. For example, at 30 cycles per second (instead of the original assumption of 36 cycles), the cycle time is 0.0333 seconds, which results in a dwell time of 0.0099 seconds (because 0.0333−0.0234=0.0099 seconds). This is more than double the dwell time at the 36 cycles per second. As a result, more erratic spacing of seeds being delivered to the spacing device 142 can be accepted and corrected. The motor "on-time" (the portion of the cycle in which the wheel is moving and thus the motor is actuating the wheel to move— including acceleration, maintaining speed, and deceleration of the wheel) is ultimately determined by the travel speed it is matching, but the acceleration rate is the same. Lower travel speeds will have somewhat longer motor "on-times", but this is more than offset by the reduction in seeds per second.

It is understood that, according to one embodiment, the cycle of the wheel 144 between rotation and dwell time can also be calculated without a full stop in rotation. Instead, the wheel 144 could operate via an accelerate-then-decelerate cycle with the "dwell time" calculated during the slow speed portion of the rotation cycle.

The various features and operational parameters (including the necessity of dwell time, etc.) of the seed spacing device 142 also apply to and can be incorporated into any of the other seed spacing devices disclosed or contemplated herein. Further, it is understood that the seed delivery system 140 and the seed spacing device 142 and any of the features or components therein can be incorporated into any other planting system and/or seed delivery system embodiments disclosed or contemplated herein.

Figure 6A:
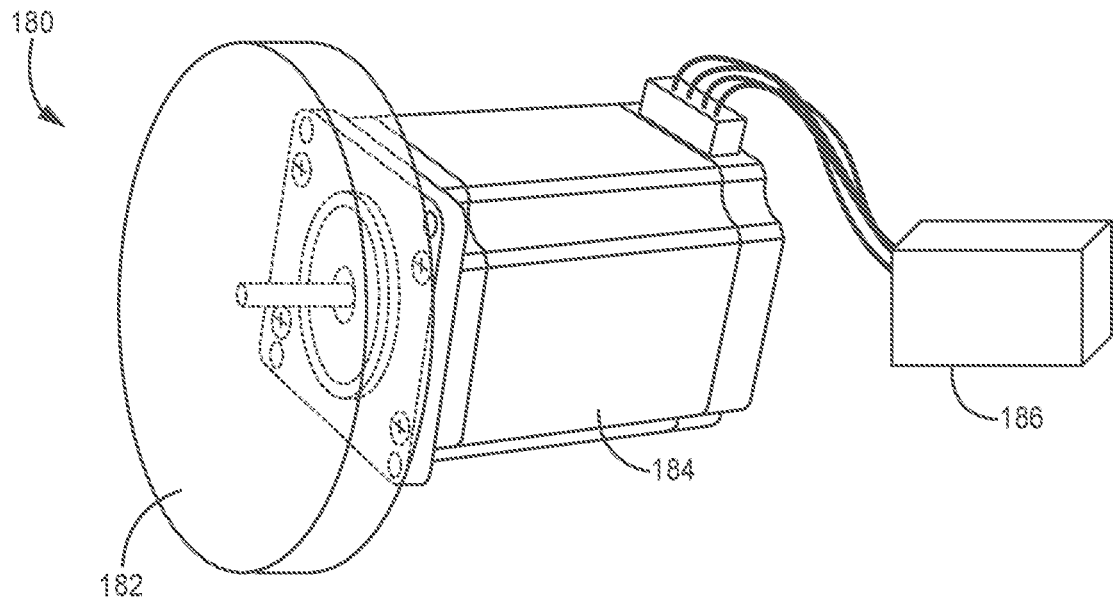
FIG. 6A is a cutaway view of a portion of a seed spacing device and a coupled motor, according to a further embodiment.
Figure 6B:
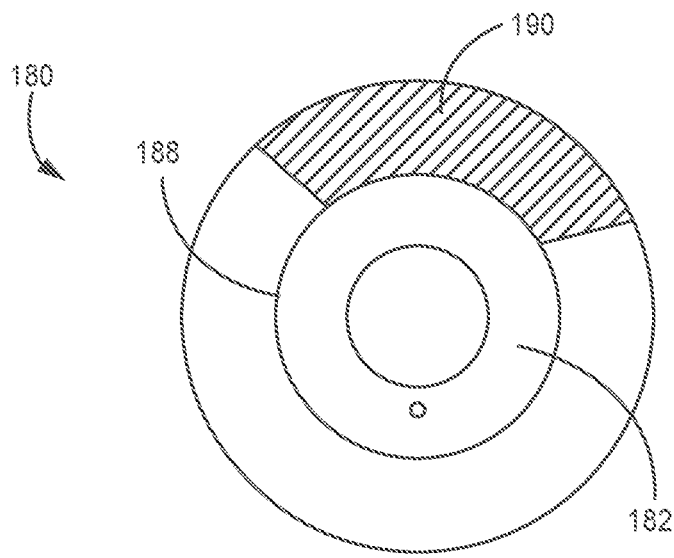
FIG. 6B is a side view of a portion of the seed spacing device of FIG. 6A, according to one embodiment.

Another seed spacing device 180 is depicted in FIGS. 6A and 6B, according to another embodiment. It is understood that this device 180 can be incorporated into any other system embodiment disclosed or contemplated herein. The device 180 is, like the device 142 discussed in detail above, a seed ejection wheel 180 that is depicted without a housing. FIG. 6A depicts the wheel core 182 without the bristles or fingers attached thereto. A motor 184 is coupled to the core 182 such that the motor 184 can rotate the core 182 in a fashion similar to that described above with respect to wheel 144. Further, the motor 184 is coupled to a spacing controller 186 such that the controller 186 can control the motor 184 in a fashion similar to the controllers 156 and 110 as described above. As best shown in FIG. 6B, the wheel 180 has bristles 190 coupled to the peripheral outer surface 188 of the core 182. It is understood that, in certain embodiments, the seed spacing device 180 can operate in a fashion substantially similar to the seed spacing device 142 discussed in detail above.

Figure 7:
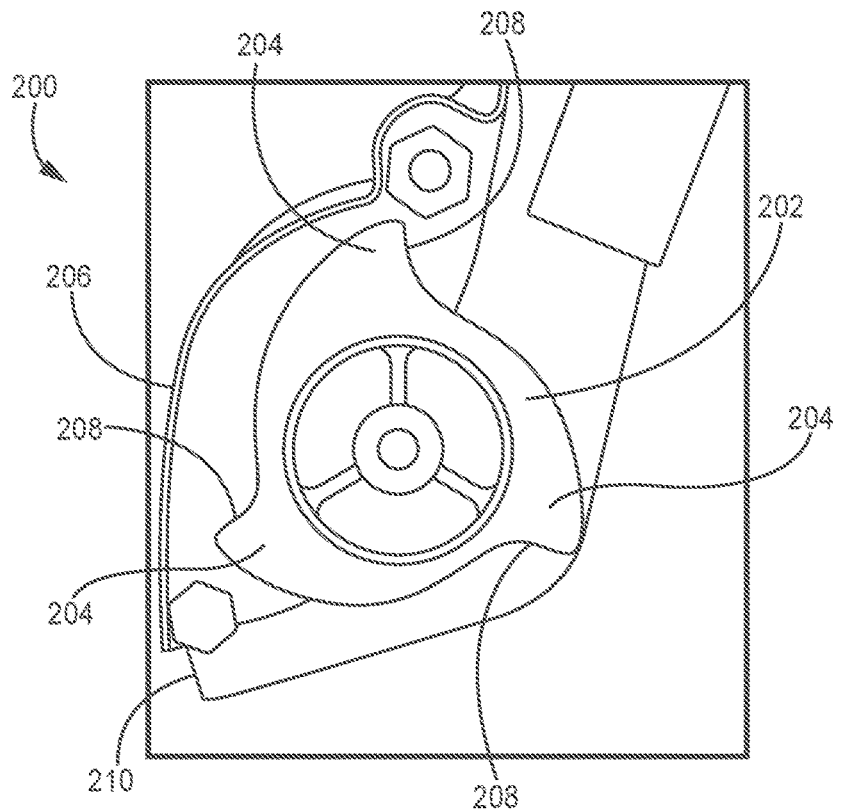
FIG. 7 is a cutaway side view of a seed spacing device, according to yet another embodiment.

Yet another seed spacing device 200 is depicted in FIG. 7, according to a further implementation. It is understood that this device 200 can be incorporated into any other system embodiment disclosed or contemplated herein. The device 200 has a rotatable wheel 202 disposed within a housing 206. The wheel 202 has three radial projections (also called "lobes" or "curved fingers") 204 that extend radially from the periphery of the wheel 202. In certain embodiments, the projections 204 are pointed projections 204 that extend radially from the wheel 202 such that the pointed edges of the projections 204 are disposed immediately adjacent to or in contact with an inner surface of the housing 206 such that no seed can pass between any projection 204 and the inner surface of the housing 206. As such, each projection 204 can urge a seed within the housing 206 around the outer periphery of the wheel 202 as the wheel 202 is rotated in a fashion similar to the wheels of the spacing device embodiments discussed above. In certain embodiments such as the exemplary implementation as depicted, each lobe 204 has a leading edge 208 that is curved in a generally concave fashion such that when the wheel 202 is rotated in a clockwise fashion, each of the leading edges 208 can make contact with a seed and urge the seed around the outer periphery of the wheel 202. While the instant embodiment has three projections 204, it is understood that the wheel 202 can have as many projections as is practical for the system.

In operation, the wheel 202 operates in a fashion similar to the spacing wheels in the spacing devices discussed above. That is, the seed delivery system can urge a singulated seed into the housing 206 when the wheel 202 is not rotating or substantially decelerated (during dwell time) such that the seed is disposed into the space defined between two lobes 204. Upon actuation of the motor (not shown) and rotation of the wheel 202, the leading edge 208 of the lobe 204 would contact the seed and urge it in a clockwise fashion until the seed reaches a location at or near the bottom of the housing 206 where the seed is ejected out the exit tube 210, which is angled towards a seed furrow in the soil surface as the planting machine is moving from left to right as depicted in the figure. It is understood that, in certain embodiments, the seed spacing device 200 can operate in a fashion substantially similar to the seed spacing devices 142, 180 discussed in detail above.

Figure 8:
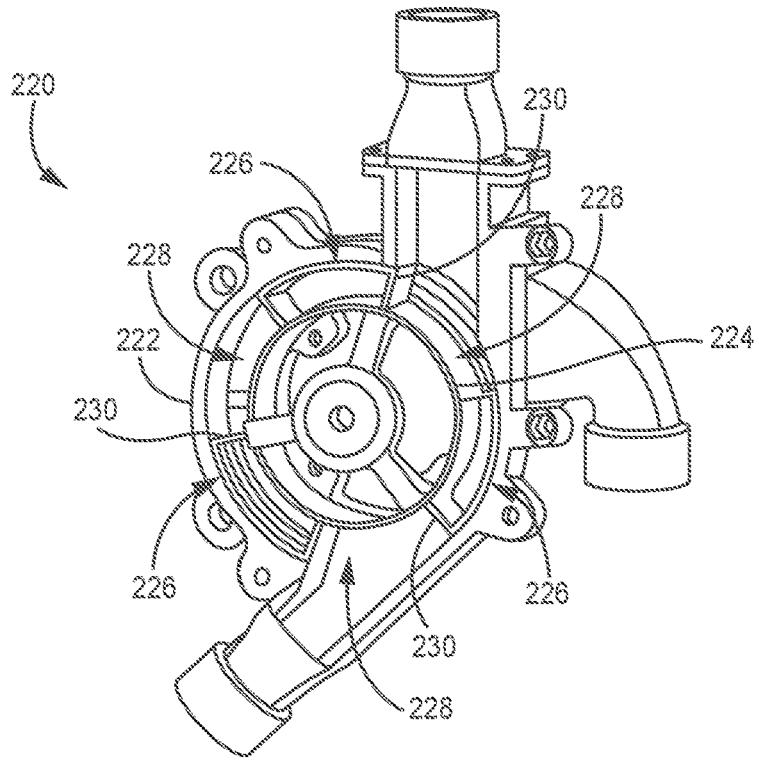
FIG. 8 is a cutaway side view of another seed spacing device, according to another embodiment.

A further seed spacing device 220 is depicted in FIG. 8, according to a further embodiment. It is understood that this device 220 can be incorporated into any other system embodiment disclosed or contemplated herein. The device 220 has a rotatable wheel 224 disposed within a housing 222. The wheel 224 has three radial projections (also called "extensions") 226 that extend radially from the periphery of the wheel 224 in a spaced configuration such that each two projections 226 define a seed chamber 228 disposed therebetween as shown. In certain embodiments, the projections 226 extend radially from the wheel 224 such that the projections 226 are disposed immediately adjacent to or in contact with an inner surface of the housing 222 such that no seed can pass between any projection 226 and the inner surface of the housing 222. Further, each projection 226 has a circumferential length such that the outer surface of each projection 226 is disposed adjacent to and substantially parallel with the inner surface of the housing 222. Each chamber 228 can urge a seed within the housing 222 around the outer periphery of the wheel 224 as the wheel 224 is rotated in a fashion similar to the wheels of the spacing device embodiments discussed above. Each projection 226 forms a leading edge 230 such that when the wheel 224 is rotated in a clockwise fashion, each of the leading edges 230 can make contact with a seed disposed within the chamber 228 and urge the seed around the outer periphery of the wheel 224. It is understood that, in certain embodiments, the seed spacing device 220 can operate in a fashion substantially similar to the seed spacing devices 142, 180, 200 discussed in detail above. While the instant embodiment has three projections 226, it is understood that the wheel 224 can have as many projections as is practical for the system.

Further, it is understood that other seed spacing devices and wheels are contemplated within the spirit of the various embodiments discussed above. That is, other device configurations can be incorporated into the various system embodiments herein to accomplish the same seed spacing as described herein. In one alternative, instead of a physical wheel, the seed spacer can utilize pressurized air.

Figure 10:
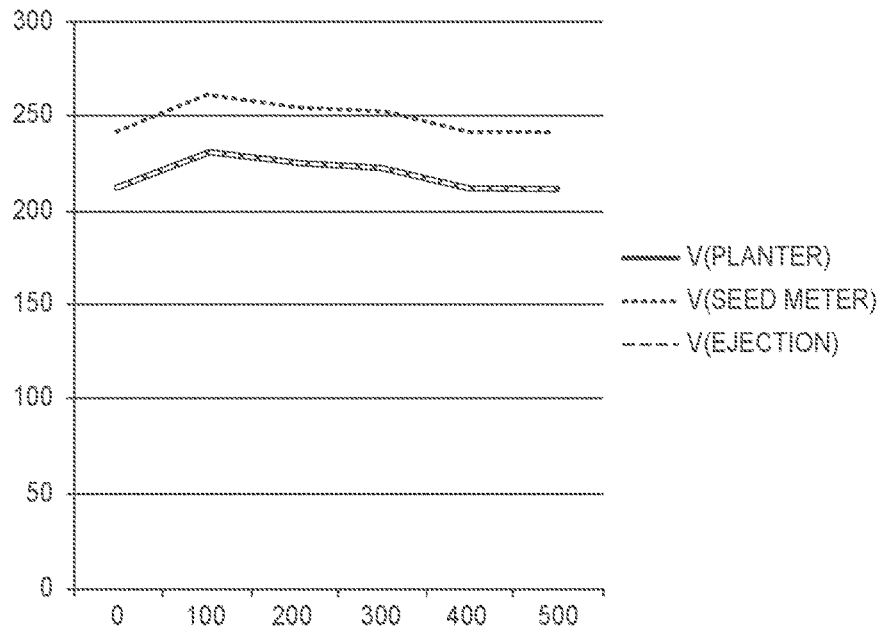
FIG. 10 is a line graph depicting the separation of seed singulation by a seed meter from seed spacing by a seed spacing device and how the system can track planter speed with seed ejection velocity to minimize any offset at the trench, according to one embodiment.

FIG. 10 is a graph depicting in graphical form how seed singulation by a seed meter is separated from seed spacing via a seed delivery system according to any embodiment disclosed or contemplated herein. As shown in the graph, each system can track planter speed with seed ejection velocity to minimize any seed offset at the furrow.

Figure 12:
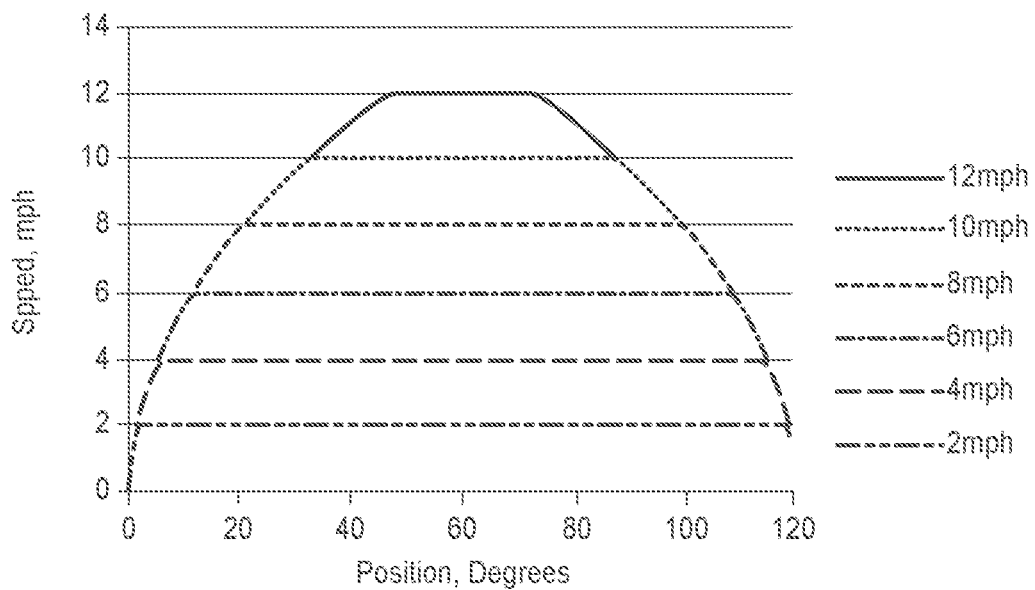
FIGS. 12, 13, and 14 are line graphs illustrating examples of seed spacer wheel accelerate/decelerate profiles that can be used, according to various embodiments.
Figure 13:
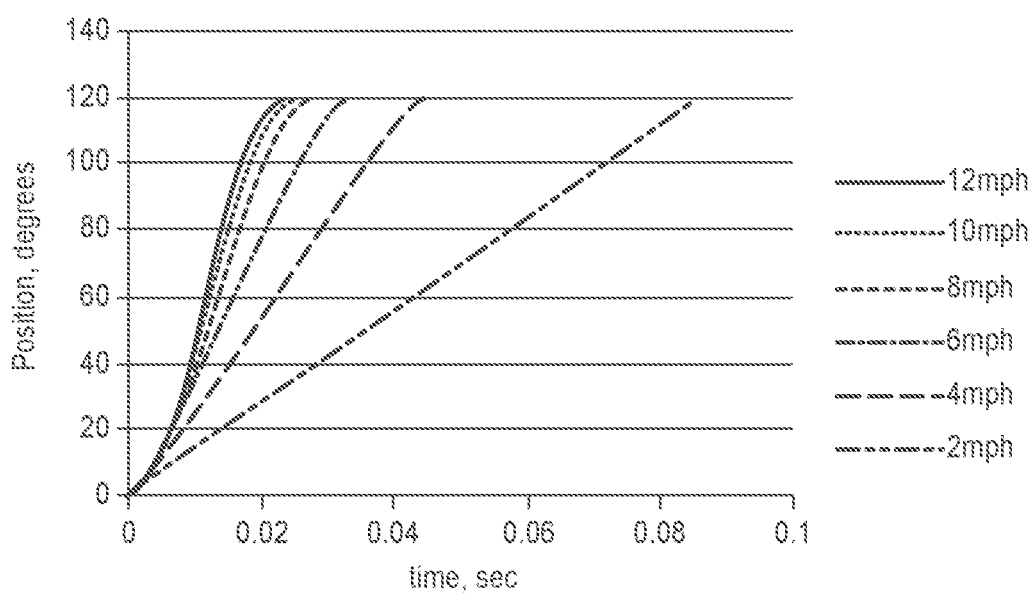
Figure 14:
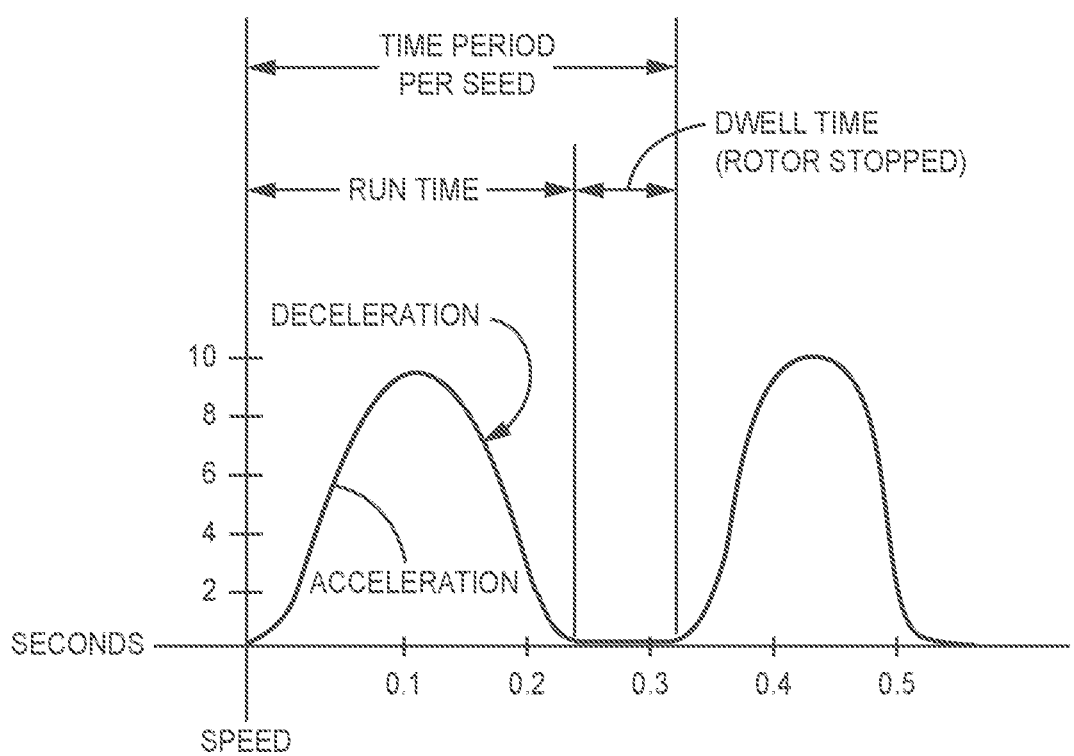

FIGS. 12, 13, and 14 are graphs that help to explain dwell time in the various system embodiments herein. These figures depict the operational characteristics of a seed spacing device of any embodiment herein that accelerates at a constant rate to the measured ground speed of the planter, holds that speed to a specific point in the rotation of the spacing wheel, and then slows. The higher the measured ground speed of the planter, the longer the acceleration time necessary to achieve the desired ejection speed for the seed. More specifically, the figures show times and positions of interest of the seed spacing device for possible planter ground speeds of 2, 4, 6, 8, 10, and 12 mph. The percentage of cycle time the ejector wheel is "open" decreases with increasing ground speed and the percentage of cycle time that the ejector wheel is stopped decreases with increasing ground speed.

In addition, the various planting systems disclosed or contemplated herein can also have unique seed metering technologies.

Figure 15:
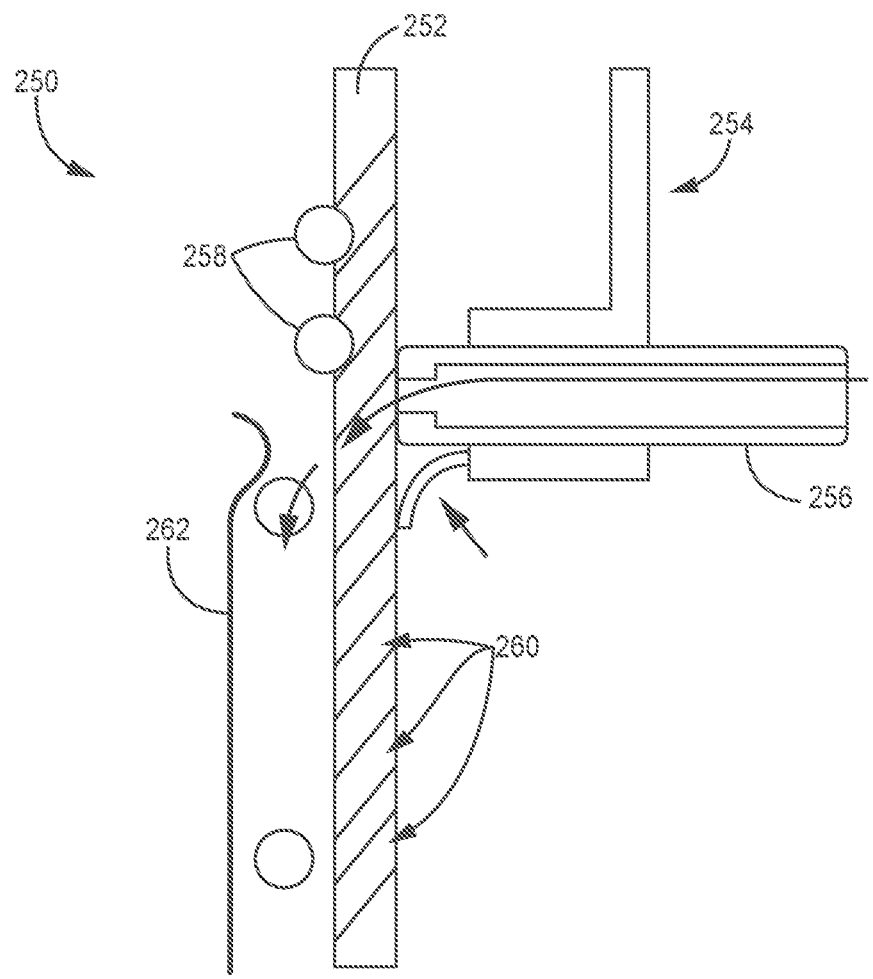
FIG. 15 is a cross-sectional side view of a seed removal mechanism for removing seed from a seed meter, according to one embodiment.
Figure 16:
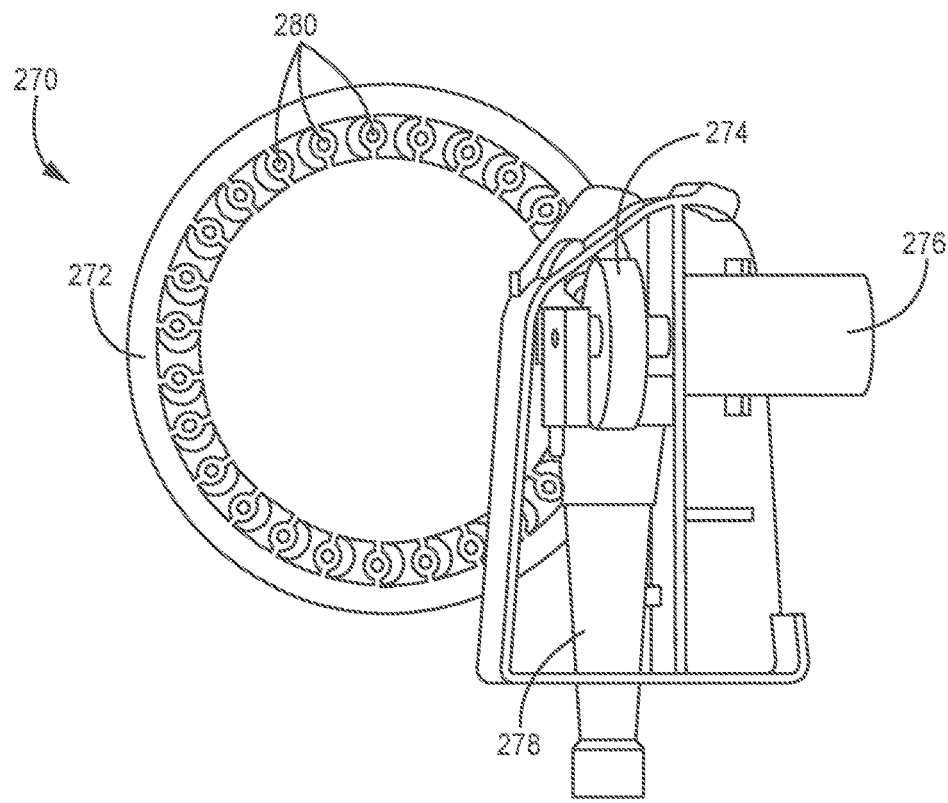
FIG. 16 is a side view of a seed removal mechanism for removing seed from a seed meter, according to a further embodiment.
Figure 17:
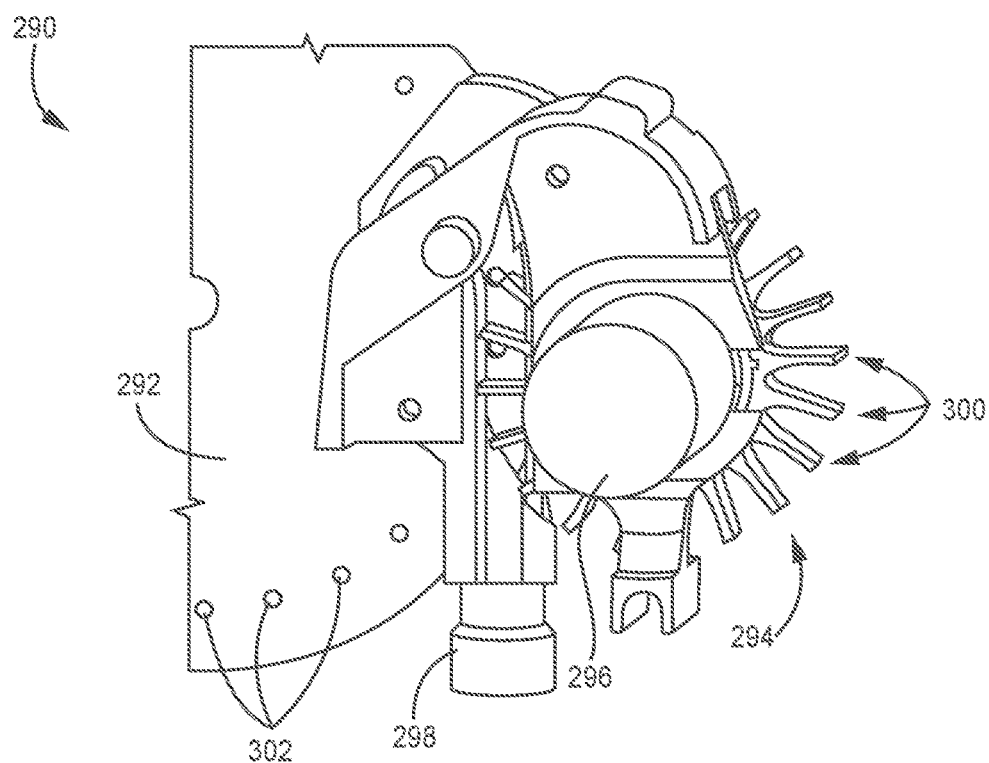
FIG. 17 is a side view of another seed removal mechanism for removing seed from a seed meter, according to yet another embodiment.

FIG. 15 depicts a seed metering device 250 that provides for active removal of seeds from a seed meter via high-pressure air, according to one embodiment. The device 250 has a seed metering disk 252, a vacuum chamber 254 adjacent to the disk, and a high-pressure air nozzle 256 that is disposed on the side of the seed metering disk 252 opposite the seeds 258. The vacuum chamber 254 applies a vacuum to the disk 252 such that the vacuum is applied to the seeds 258 via the openings 260 in the seed disk 252, thereby urging the seeds 258 against the openings 260, thereby retaining the seeds 258 on the disk 252 while the openings 260 are in communication with the vacuum chamber 254. In addition, the device 250 has a seed channel 262 disposed next to the disk 252 on the same side as the seeds 258. In operation, as the metering disk 252 rotates, the openings 260 rotate past the vacuum chamber 254 until they move toward and adjacent to the air nozzle 256. As a result, the vacuum from the vacuum chamber 254 is no longer applied to the seeds via the openings 260. Further, as an opening 260 passed adjacent to the nozzle 256, the nozzle expels high-pressured air through the opening 260, thereby urging the seed 258 away from the disk 252 and downward into the channel 262. It is understood that the channel 262 is in communication with a seed delivery device (not shown) such that the seed 258 is urged into the seed delivery device and ultimately delivered to the seed furrow. It is further understood that the metering device 250 can be incorporated into any of the seed planting systems and integrated with any of the seed delivery systems disclosed or contemplated herein. Further, the seed metering device 250 can also be incorporated into any other known planting systems and/or seed delivery systems.

Another seed metering device 270 that provides for active mechanical removal of seeds from a seed meter, according to a further embodiment. The device 270 has a seed metering disk 272, a seed stripper wheel 274 disposed adjacent to the disk 272, a motor 276 coupled to the stripper wheel, and a seed channel 278 disposed below the wheel 274 such that each seed removed from the disk 272 is urged into the channel 278. In one embodiment, the seed stripper wheel 274 has a frictional outer surface such that the wheel 274 can contact each seed on the disk 272 and frictionally remove that seed via the frictional outer surface of the wheel 274. In operation, the wheel 274 is disposed in contact with or immediately adjacent to the metering disk 272 in the position as shown such that as the disk 272 rotates, each opening 280 in the disk 272 is rotated into the path of the wheel 274 such that the wheel 274 contacts the seed in the opening 280 and pulls or otherwise urges the seed downward out of the opening 280 and into the channel 278. It is understood that the channel 278 is in communication with a seed delivery device (not shown) such that the seed is urged into the seed delivery device and ultimately delivered to the seed furrow. It is further understood that the metering device 270 can be incorporated into any of the seed planting systems and integrated with any of the seed delivery systems disclosed or contemplated herein. Further, the seed metering device 270 can also be incorporated into any other known planting systems and/or seed delivery systems.

Yet another seed metering device 290 that provides for active mechanical removal of seeds from a seed meter, according to yet another implementation. The device 290 has a seed metering disk 292, a seed stripper wheel 294 disposed adjacent to the disk 292, a motor 296 coupled to the stripper wheel, and a seed channel 298 disposed below the wheel 294 such that each seed removed from the disk 292 is urged into the channel 298. In one embodiment, the seed stripper wheel 294 has radial fingers (or "projections") 300 extending from the wheel 294 such that the fingers 300 of the wheel 294 can contact each seed on the disk 292 and physically knock that seed from the disk 292 via the fingers 300. In operation, the wheel 294 is disposed in contact with or immediately adjacent to the metering disk 292 in the position as shown such that as the disk 292 rotates, each opening 302 in the disk 292 is rotated into the path of the wheel 294 such that the fingers 300 contact the seed in the opening 302 and knocks the seed downward out of the opening 302 and into the channel 298. It is understood that the channel 298 is in communication with a seed delivery device (not shown) such that the seed is urged into the seed delivery device and ultimately delivered to the seed furrow. It is further understood that the metering device 290 can be incorporated into any of the seed planting systems and integrated with any of the seed delivery systems disclosed or contemplated herein. Further, the seed metering device 290 can also be incorporated into any other known planting systems and/or seed delivery systems.

While the specific examples discussed herein with respect to the various planting system embodiments, including the various seed metering and seed delivery implementations, were discussed in the context of maize seeds, it is understood that these various embodiments can also be used in substantially similar or analogous ways to plant other seeds, including soybeans, cotton, grain sorghum, sugar beets, high value vegetable crops, and any other crop that is cultivated using row crop planting methods. Further, they can also be used to serially dispense other types of particles from a moving machine.

Although the present invention has been described with reference to preferred embodiments, persons skilled in the art will recognize that changes may be made in form and detail without departing from the spirit and scope of the invention.

What is claimed is:

1. A system for controlling seed spacing in a field comprising:
   (a) a seed metering device constructed and arranged to singulate seed at an independently controllable singulation rate;
   (b) a seed delivery channel comprising a proximal opening at a proximal end in communication with the seed metering device and a distal opening at a distal end;
   (c) a seed spacing device disposed adjacent to the distal end of the seed delivery channel, the seed spacing device comprising a seed ejection wheel rotatably disposed therein; and
   (d) a seed ejection wheel actuator operably coupled to the seed ejection wheel, the seed ejection wheel actuator constructed and arranged to independently control starting, stopping, and rotational speed of the seed ejection wheel.

2. The system of claim 1, wherein the seed spacing device comprises:
   (a) a housing, wherein the seed ejection wheel is rotatably disposed within the housing;
   (b) a seed intake channel in communication with the distal opening of the seed delivery channel such that the seed intake channel is constructed and arranged to receive seeds from the seed delivery channel; and
   (c) a seed ejection opening defined in the housing.

3. The system of claim 1, wherein the seed ejection wheel comprises at least three seed chambers defined along an outer periphery of the seed ejection wheel.

4. The system of claim 3, wherein the at least three seed chambers are defined by at least three projections extending radially from the seed ejection wheel.

5. The system of claim 1, wherein the seed ejection wheel comprises a core wheel and a plurality of bristles coupled to an outer periphery of the core wheel and extending radially therefrom.

6. The system of claim 1, further comprising an air pressure source operably coupled to the seed delivery channel.

7. The system of claim 6, wherein the air pressure source is operably coupled to the seed delivery channel at or near the proximal end of the seed delivery channel, wherein the air pressure source is in fluidic communication with a lumen of the seed delivery channel.

8. A seed spacing system, comprising:
   (a) a seed spacer in communication with a distal end of a seed tube and
   (b) a spacer controller in communication with the seed spacer,
   wherein the spacer controller controls the seed spacer for ejection of seed into a furrow at an independently controllable rate, and wherein seed is retained within the seed spacer for a dwell time before ejection into the furrow.

9. The system of claim 8, further comprising a system controller in communication with the spacer controller wherein the seed spacer is controllable based on planter velocity.

10. The system of claim 9, further comprising a seed detection sensor disposed at an inlet of the seed spacer, the seed detection sensor in communication with the system controller.

11. The system of claim 9, further comprising a planter velocity sensor in communication with the system controller configured to measure planter velocity.

12. The system of claim 9, wherein seed is delivered to the seed spacer from a seed meter and wherein the seed meter is in communication with the system controller.

13. The system of claim 8, further comprising a seed ejection wheel rotatably disposed within the seed spacer and a seed ejection wheel actuator operably coupled to the seed ejection wheel, the seed ejection wheel actuator constructed and arranged to control starting, stopping, and rotational speed of the seed ejection wheel.

14. A seed delivery system comprising a seed spacer configured to receive singulated seed and transport singulated seed toward a furrow, wherein seed is retained in the seed spacer for a dwell time before transport to the furrow, and wherein the seed spacer is controlled based on a planter velocity and the singulated seed is transported into the furrow at substantially the same velocity as the planter velocity.

15. The system of claim 14, further comprising a delivery tube and an air pressure source configured to generate air pressure to urge seeds along the delivery tube toward the seed spacer.

16. The system of claim 14, further comprising a delivery tube and a vacuum source configured to urge seeds along the delivery tube toward the seed spacer.

17. The system of claim 14, wherein singulated seed is transported into the furrow at a selectable rate.

* * * * *